United States Patent [19]

Yamada et al.

[11] Patent Number: 5,136,228
[45] Date of Patent: Aug. 4, 1992

[54] INDUCTION MOTOR VECTOR CONTROL

[75] Inventors: Tetuo Yamada; Yasuhiro Yamamoto, both of Tokyo, Japan

[73] Assignee: Kabushiki Kaisha Meidensha, Japan

[21] Appl. No.: 713,779

[22] Filed: Jun. 12, 1991

[30] Foreign Application Priority Data

Dec. 11, 1990 [JP] Japan .................................. 2-401421

[51] Int. Cl.⁵ .............................................. H02P 5/40
[52] U.S. Cl. ..................................... 318/808; 318/800
[58] Field of Search ......................... 318/800, 803–811

[56] References Cited

U.S. PATENT DOCUMENTS

| | | | |
|---|---|---|---|
| 4,431,957 | 2/1984 | Chausse et al. | 318/805 |
| 4,509,003 | 2/1985 | Oanishi | 318/800 |
| 4,677,361 | 6/1987 | Yonemoto | 318/805 |
| 4,680,695 | 7/1987 | Kerkman et al. | 318/800 |

FOREIGN PATENT DOCUMENTS

| | | |
|---|---|---|
| 0310050 | 4/1989 | European Pat. Off. . |
| 0330188 | 8/1989 | European Pat. Off. . |
| 3820125 | 12/1988 | Fed. Rep. of Germany . |
| 139187 | 7/1985 | Japan . |
| 2190805 | 11/1987 | United Kingdom . |

OTHER PUBLICATIONS

Fetz, et al., Comparison of Different Field Oriented Control Methods For an Induction Machine Fed by a PWM-Codulator Controlled Inverter, 1989 Patent Abstracts of Japan, JP-A-61-147788, Nov. 21, 1986, vol. 10.

*Primary Examiner*—David Smith, Jr.

[57] ABSTRACT

An induction motor vector control apparatus employing a rotating Cartesian coordinate system (d,q) having a d-axis held in coincidence with a secondary flux of the induction motor. Another rotating Cartesian coordinate system ($\gamma$, $\delta$) having a $\gamma$-axis held in coincidence with the induction motor primary current to detects a $\delta$-axis induction motor primary voltage change caused by a change in the induction motor secondary resistance. The $\delta$-axis primary voltage change contains no component related to a primary resistance change and it is used to compensate the secondary resistance for its change.

29 Claims, 13 Drawing Sheets

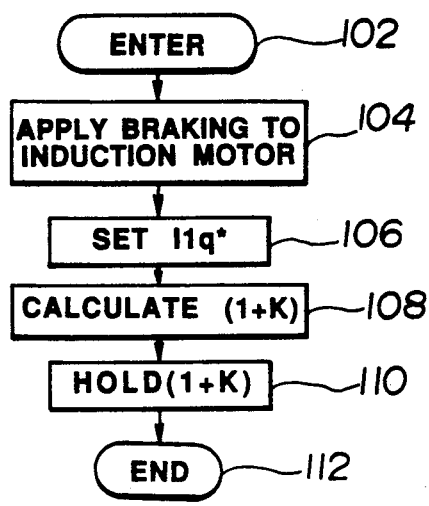
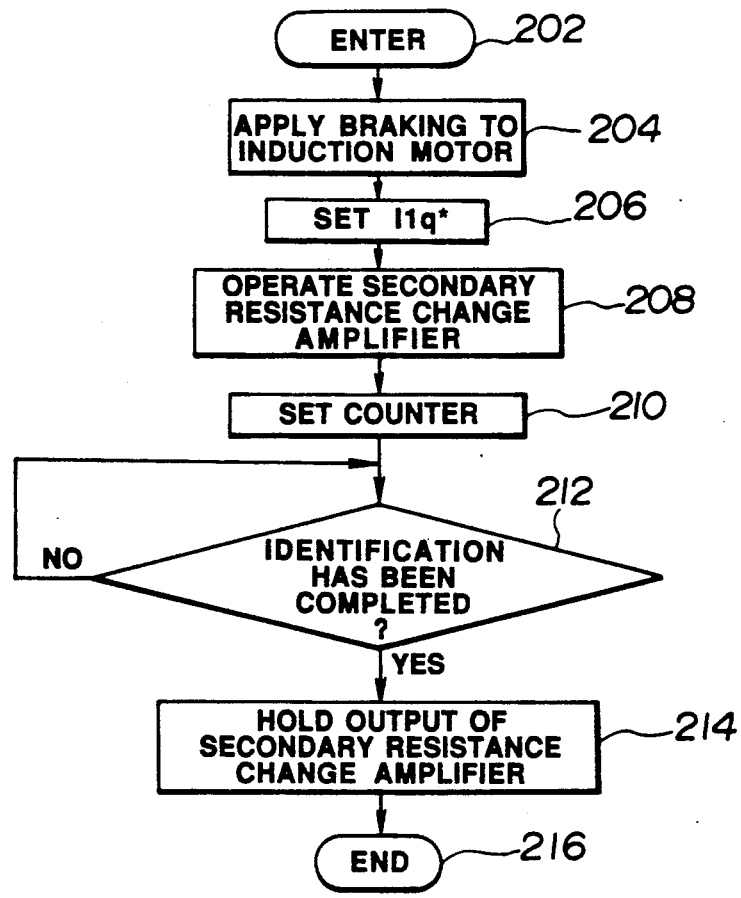

INDUCTION MOTOR VECTOR CONTROL

BACKGROUND OF THE INVENTION

This invention relates to an apparatus for controlling an adjustable speed electric motor and, more particularly, to an apparatus for vector control of an induction motor.

Electric power converters or inverters have been employed for the application of adjustable speed drives using alternating current motors. A typical converter includes a direct current (DC) rectifier for rectifying three-phase AC input voltage and for supplying the resulting direct current (DC) bus potential to an inverter. The inverter comprises a plurality of pairs of series-connected switching elements to generate an adjustable frequency output. In many applications, such as a frequency adjustment is effected through a control circuit which employs a pulse width modulation (PWM) control technique in producing variable frequency gating pulses to periodically switch the respective switching elements so as to operate the motor at a variable speed. The motor can be propelled (motoring mode) or retarded (braking mode) as desired by appropriately varying the frequency and the amplitude of the excitation that the inverter applies to the motor.

The actual motor speed is sensed and compared with a commanded motor speed. A speed error signal, which depends on the difference between the actual and desired values of motor speed, is derived and applied to a proportional plus integral control circuit which converts it into a torque command signal. The control circuit responds to the torque command signal by controlling the operation of the inverter so as to vary, as a function of the torque command signal, the amplitude of the voltage supplied from the inverter to the motor.

In order to provide more accurate motor control and linear motor torque control for variations in commanded torque, vector control has been proposed and employed. Such vector control utilizes a secondary flux rotational speed together with the torque command signal to control the momentary values of the frequency and amplitude of the stator current of the motor. It has been proposed to compensate for the influence of changes in the primary and secondary resistances of the induction motor on the vector control. The compensation has been made on an assumption that the excitation current is constant. However, this assumption is not satisfied when the secondary flux changes.

SUMMARY OF THE INVENTION

Therefore, a main object of the invention is provide an improved vector control apparatus which can provide more accurate motor control.

There is provided, in accordance with the invention, an apparatus employing a rotating Cartesian coordinate system (d, q) having a d-axis and q-axis, the d-axis being held in coincidence with a secondary flux of the induction motor, for vector control of an adjustable-speed induction motor. The apparatus comprises means for applying a primary current and voltage to drive the induction motor, means sensitive to an induction motor angular velocity for producing an induction motor angular velocity value $\omega r$, means for producing a d-axis secondary flux command value $\lambda 2d^*$, means for calculating a d-axis primary current command value $i1d^*$ as a function of the d-axis secondary flux command value $\lambda 2d^*$ and a secondary time constant command value $L2^*/R2^*$, means for producing a q-axis primary current command value $i1q^*$, means employing a rotating Cartesian coordinate system ($\gamma$, $\delta$) having a $\gamma$-axis and $\delta$-axis, the $\gamma$-axis being held in coincidence with the primary current I1, for calculating a $\gamma$-axis primary current command value $i1\gamma^*$ and a phase angle $\psi$ of the $\gamma$-axis with respect to the d-axis as a function of the primary current command values $i1d^*$ and $i1q^*$, means for calculating the $\gamma$- and $\delta$-axis primary voltage command values $v1\gamma^*$ and $v1\delta^*$ as a function of the $\gamma$-axis primary current command value $i1\gamma^*$, the phase angle $\psi$, the d-axis secondary flux command value $\lambda 2d^*$, the $\gamma$-axis primary current command value $i1\gamma^*$, and a primary voltage angular frequency command signal $\omega 0$, means for sensing the primary current and converting the sensed primary current into $\gamma$- and $\delta$-axis primary current values $i1\gamma$ and $i1\delta$, means for calculating a $\gamma$-axis primary voltage change $\Delta v1\gamma$ as a function of the $\gamma$-axis primary current value $i1\gamma$ and the $\gamma$-axis primary current command value $i1\gamma^*$, means for calculating a $\delta$-axis primary voltage change $\Delta v1\delta$ as a function of the $\delta$-axis primary current value $i1\delta$ and a $\delta$-axis primary current command value $i1\delta$, means for adding the $\gamma$-axis primary voltage change $\Delta v1\gamma$ to the $\gamma$-axis primary voltage command value $v1\gamma^*$ to produce a $\gamma$-axis primary voltage command value $v1\gamma$, means for adding the $\delta$-axis primary voltage change $\Delta v1\delta$ to the $\delta$-axis primary voltage command value $v1\delta$ to produce a $\delta$-axis primary voltage command signal $v1\delta$, means for calculating a secondary resistance change as a function of the d-axis primary current command value $i1d^*$, the q-axis primary current command value $i1q^*$, the $\gamma$-axis primary current command value $i1\gamma^*$, the d-axis secondary flux command value $\lambda 2d^*$, the primary voltage angular frequency $\omega 0$ and the $\delta$-axis primary voltage change $\Delta v1\delta$, means for correcting the secondary time constant command value $L2^*/R2^*$ based upon the secondary resistance change, means for calculating a slip frequency $\omega s$ as a function of the q-axis primary current command value $i1q^*$, the d-axis secondary flux command value $\lambda 2d^*$, and the corrected secondary time constant command value, means for adding the slip frequency $\omega s$ to the induction motor angular velocity value $\omega r$ to produce the primary voltage angular frequency $\omega 0$, and means for controlling the motor driving means to adjust the primary voltage based upon the primary voltage command signals $v1\gamma$ and $v1\delta$, and the primary voltage angular frequency $\omega 0$.

In another aspect of the invention, the induction motor vector control apparatus comprises means for applying a primary current and voltage to drive the induction motor, means sensitive to an induction motor angular velocity for producing an induction motor angular velocity value $\omega r$, means for producing a d-axis secondary flux command value $\lambda 2d^*$, means for calculating a d-axis primary current command value $i1d^*$ as a function of the d-axis secondary flux command value $\lambda 2d^*$, and a secondary time constant command value $L2^*/R2^*$, means for producing a q-axis primary current command value $i1q^*$, means employing a rotating Cartesian coordinate system ($\gamma$, $\delta$) having a $\gamma$-axis and $\delta$-axis, the $\gamma$-axis being held in coincidence with the primary current I1, for calculating a $\gamma$-axis primary current command value $i1\gamma^*$ and a phase angle $\psi$ of the $\gamma$-axis with respect to the d-axis as a function of the primary current command values $i1d^*$ and $i1q^*$, means for calculating the $\gamma$- and $\delta$-axis primary voltage command values $v1\gamma^*$ and $v1\delta^*$ as a function of the $\gamma$-axis primary current command value $i1\gamma^*$, the phase angle $\psi$, the d-axis secondary flux command value $\lambda 2d^*$, the $\gamma$-axis primary current command value $i1\gamma^*$, and a primary voltage angular frequency command signal $\omega 0$, means for sensing the primary current and converting the sensed primary current into $\gamma$- and $\delta$-axis primary current values $i1\gamma$ and $i1\delta$, means for calculating a $\gamma$-axis primary voltage change $\Delta v1\gamma$ as a function of the $\gamma$-axis primary current value $i1\gamma$ and the $\gamma$-axis primary current command value $i1\gamma^*$, means for subtracting the $\delta$-axis primary current $i1\delta$ from the $\delta$-axis primary current command value $i1\delta^*$ to produce a difference ($i1\delta^* - i1\delta$), means for multiplying the difference ($i1\delta^* - i1\delta$) by a leakage inductance $L\sigma$ to produce a multiplied value ($i1\delta^* - i1\delta$).$L\sigma$, means for integrating the difference ($i1\delta^* - i1\delta$) to produce an integrated value $\Delta v1\delta I$, means for adding the multiplied value to the integrated value to produce a $\delta$-axis primary voltage change $\Delta v1\delta$, means for adding the $\gamma$-axis primary voltage change $\Delta v1\gamma$ to the $\gamma$-axis primary voltage command value $v1\gamma^*$ to produce a $\gamma$-axis primary voltage command value $v1\gamma$, means for adding the $\delta$-axis primary voltage change $\Delta v1\delta$ to the $\delta$-axis primary voltage command value $v1\delta^*$ to produce a $\delta$-axis primary voltage command signal $v1\delta$, means for calculating a secondary resistance change as a function of the d-axis primary current command value $i1d^*$, the q-axis primary current command value $i1q^*$, the $\gamma$-axis primary current command value $i1\gamma^*$, the d-axis secondary flux command value $\lambda 2d^*$, the primary voltage angular frequency $\omega 0$ and the integrated value $\Delta v1\delta I$, means for correcting the secondary time constant command value $L2^*/R2^*$ based upon the secondary resistance change, means for calculating a slip frequency $\omega s$ as a function of the q-axis primary current command value $i1q^*$, the d-axis secondary flux command value $\lambda 2d^*$, and the corrected secondary time constant command value, means for adding the slip frequency $\omega s$ to the induction motor angular velocity value $\omega r$ to produce the primary voltage angular frequency $\omega 0$, and means for controlling the motor driving means to adjust the primary voltage based upon the primary voltage command signals $v1\gamma$ and $v1\delta$, and the primary voltage angular frequency $\omega 0$.

In still another aspect of the invention, the induction motor vector control apparatus comprises means for applying a primary current and voltage to drive the induction motor, means sensitive to an induction motor angular velocity for producing an induction motor angular velocity value $\omega r$, means for producing a d-axis secondary flux command value $\lambda 2d^*$, means for calculating a d-axis primary current command value $i1d^*$ as a function of the d-axis secondary flux command value $\lambda 2d^*$, and a secondary time constant command value $L2^*/R2^*$, means for producing a q-axis primary current command value $i1q^*$, means employing a rotating Cartesian coordinate system ($\gamma$, $\delta$) having a $\gamma$-axis and $\delta$-axis, the $\gamma$-axis being held in coincidence with the primary current $I1$, for calculating a $\gamma$-axis primary current command value $i1\gamma^*$ and a phase angle $\psi$ of the $\gamma$-axis with respect to the d-axis as a function of the primary current command values $i1d^*$ and $i1q^*$, means for calculating the $\gamma$- and $\delta$-axis primary voltage command values $v1\gamma^*$ and $v1\delta^*$ as a function of the $\gamma$-axis primary current command value $i1\gamma^*$, the phase angle $\psi$, the d-axis secondary flux command value $\lambda 2d^*$, the $\gamma$-axis primary current command value $i1\gamma^*$, and a primary voltage angular frequency command signal $\omega 0$, means for sensing the primary current and converting the sensed primary current into $\gamma$- and $\delta$-axis primary current values $i1\gamma$ and $i1\delta$, means for calculating a $\gamma$-axis primary voltage change $\Delta v1\gamma$ as a function of the $\gamma$-axis primary current value $i1\gamma$ and the $\gamma$-axis primary current command value $i1\gamma^*$, means for calculating a $\delta$-axis primary voltage change $\Delta v1\delta$ as a function of the $\delta$-axis primary current value $i1\delta$ and a $\delta$-axis primary current command value $i1\delta^*$, means for adding the $\gamma$-axis primary voltage change $\Delta v1\gamma$ to the $\gamma$-axis primary voltage command value $v1\gamma^*$ to produce a $\gamma$-axis primary voltage command value $v1\gamma$, means for adding the $\delta$-axis primary voltage change $\Delta v1\delta$ to the $\delta$-axis primary voltage command value $v1\delta^*$ to produce a $\delta$-axis primary voltage command signal $v1\delta$, means for calculating a slip frequency command value $\omega s^*$ as a function of the q-axis primary current command value $i1q^*$ and the d-axis secondary flux command value $\lambda 2d^*$, and the corrected secondary time constant command value, means for calculating a difference of the $\delta$-axis primary voltage change $\Delta v1\delta$ from a $\delta$-axis primary voltage change command value, means for calculating a slip frequency change $\Delta \omega s$ as a function of the calculated difference, means for adding the slip frequency change $\Delta \omega s$ to the slip frequency command value $\omega s^*$ to produce a slip frequency $\omega s$, means for adding the slip frequency $\omega s$ to the induction motor angular velocity value $\omega r$ to produce the primary voltage angular frequency $\omega 0$, and means for controlling the motor driving means to adjust the primary voltage based upon the primary voltage command signals $v1\gamma$ and $v1\delta$, and the primary voltage angular frequency $\omega 0$.

In another aspect of the invention, the induction motor vector control apparatus comprises means for applying a primary current and voltage to drive the induction motor, means sensitive to an induction motor angular velocity for producing an induction motor angular velocity value $\omega r$, means for producing a d-axis secondary flux command value $\lambda 2d^*$, means for calculating a d-axis primary current command value $i1d^*$ as a function of the d-axis secondary flux command value $\lambda 2d^*$, and a secondary time constant command value $L2^*/R2^*$, means for producing a q-axis primary current command value $i1q^*$, means employing a rotating Cartesian coordinate system ($\gamma$, $\delta$) having a $\gamma$-axis and $\delta$-axis, the $\gamma$-axis being held in coincidence with the primary current $I1$, for calculating a $\gamma$-axis primary current command value $i1\gamma^*$ and a phase angle of the $\gamma$-axis with respect to the d-axis as a function of the primary current command values $i1d^*$ and $i1q^*$, means for calculating the $\gamma$- and $\delta$-axis primary voltage command values $v1\gamma^*$ and $v1\delta^*$ as a function of the $\gamma$-axis primary current command value $i1\gamma^*$, the phase angle $\psi$, the d-axis secondary flux command value $\lambda 2d^*$, the $\gamma$-axis primary current command value $i1\gamma^*$, and a primary voltage angular frequency command signal $\omega 0$, means for sensing the primary current and converting the sensed primary current into $\gamma$- and $\delta$-axis primary current values $i1\gamma$ and $i1\delta$, means for calculating a $\gamma$-axis primary voltage change $\Delta v1\gamma$ as a function of the $\gamma$-axis primary current value $i1\gamma$ and the $\gamma$-axis primary current command value $i1\gamma^*$, means for subtracting the $\delta$-axis primary current $i1\delta$ from the $\delta$-axis primary current command value $i1\delta^*$ to produce a difference ($i1\delta^* - i1\delta$), means for multiplying the difference ($i1\delta^* - i1\delta$) by a leakage inductance $L\sigma$ to produce a multiplied value ($i1\delta^* - i1\delta$).$L\sigma$, means for integrating the difference (i1δ*−i1δ) to produce an integrated value Δv1δI, means for adding the multiplied value to the integrated value to produce a δ-axis primary voltage change Δv1δ, means for adding the δ-axis primary voltage change Δv1γ to the γ-axis primary voltage command value v1γ* to produce a γ-axis primary voltage command value v1γ, means for adding the δ-axis primary voltage change Δv1δ to the δ-axis primary voltage command value v1δ* to produce a δ-axis primary voltage command signal v1δ, means for calculating a slip frequency command value ωs* as a function of the q-axis primary current command value i1q* and the d-axis secondary flux command value λ2d*, and the corrected secondary time constant command value, means for calculating a difference of the δ-axis primary voltage change Δv1δ from a δ-axis primary voltage change command value, means for calculating a secondary resistance change K as a function of the calculated difference, means for multiplying the calculated difference by the slip frequency command value ωs* to produce a slip frequency change Δωs, means for adding the slip frequency change Δωs to the slip frequency command value ωs* to produce a slip frequency ωs, means for adding the slip frequency ωs to the induction motor angular velocity value ωr to produce the primary voltage angular frequency ω0, and means for controlling the motor driving means to adjust the primary voltage based upon the primary voltage command signals v1γ and v1δ, and the primary voltage angular frequency ω0.

BRIEF DESCRIPTION OF THE DRAWINGS

The invention will be described in greater detail by reference to the following description taken in connection with the accompanying drawings, in which like reference numerals identify like elements in the several figures and in which:

FIG. 15 is a flow diagram showing the programming of the digital computer used in the induction motor vector control apparatus of the invention; and FIG. 16 is a flow diagram showing the programming of the digital computer used in the induction motor vector control apparatus of the invention.

DETAILED DESCRIPTION OF THE INVENTION

Figure 1:
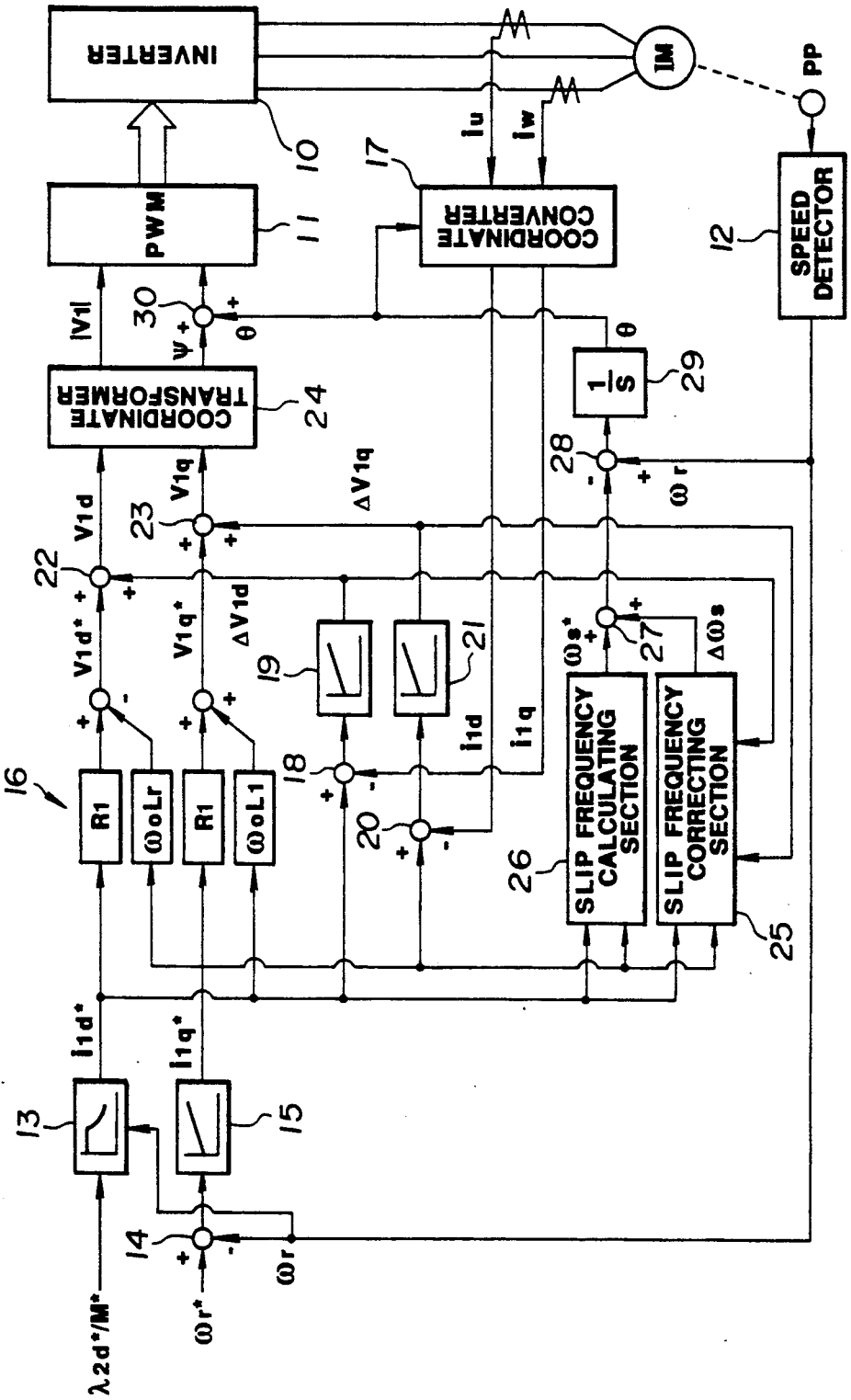
FIG. 1 is a schematic diagram showing a prior art induction motor vector control apparatus.

Prior to the description of the preferred embodiments of the present invention, the prior art vector control apparatus of FIG. 1 is briefly described.

The principles on which the conventional vector control apparatus is based are as follows: An induction motor voltage equation expressed in a two-dimensional Cartesian coordinate system (d, q) rotating at the same angular velocity as the angular velocity of the primary voltage to the induction motor is given as $$\begin{bmatrix} v1d \\ v1q \\ 0 \\ 0 \end{bmatrix} = \begin{bmatrix} R1 + L\sigma P & -L\sigma\omega & \frac{M}{L2}P & -\frac{M}{L2}\omega \\ L\sigma\omega & R1 + L\sigma P & \frac{M}{L2}\omega & \frac{M}{L2}P \\ -\frac{R2}{L2}M & 0 & \frac{R2}{L2} + P & -\omega s \\ 0 & -\frac{R2}{L2}M & \omega s & \frac{R2}{L2} + P \end{bmatrix} \begin{bmatrix} i1d \\ i1q \\ \lambda 2d \\ \lambda 2q \end{bmatrix} \quad (1)$$

where ωs=ω−ωr, Lσ=(L1·L2−M²)/L2, v1d is the primary voltage in the d-axis, v1q is the primary voltage in the q-axis, i1d is the primary current in the d-axis, i1q is the primary current in the q-axis, λ2d is the secondary flux in the d-axis, λ2q is the secondary flux in the q-axis, P is the differentiating operator, R1 is the primary resistance, R2 is the secondary resistance, L1 is the primary inductance, L2 is the secondary inductance, M is the excitation inductance, Lσ is the equivalent leakage inductance, ω is the primary voltage angular frequency, ωr is the rotor angular frequency, and ωs is the slip frequency.

Assuming now that the d-axis is held in coincidence with the direction of the secondary flux, the q-axis secondary flux λ2q is zero, the d-axis secondary flux λ2d is a constant value φ2, the d-axis secondary current i2d is zero, and the q-axis secondary current i2q is equal to the secondary current i2. It is, therefore, possible to control the induction motor like DC motors.

The d- and q-axis secondary flux λ2d and λ2q are $$\lambda 2d = M \cdot i1d + L2 \cdot i2d \quad (2)$$

$$\lambda 2q = M \cdot i1q + L2 \cdot i2q \quad (3)$$

Since i2d=0 and i2q=0 under the vector control, the d-axis secondary flux is equal to M·i1d and the q-axis primary current i1q is equal to −L2/M·i2q. Thus, the q-axis primary current i1q is proportional to the torque current.

From the fourth row of Equation (1), the following equation is derived:

$$-\frac{R2}{L2} \cdot M \cdot i1q + \omega s \cdot \lambda 2d = 0 \quad (4)$$

This equation is solved for the slip frequency as $$\omega s = \frac{R2}{L2} \cdot \frac{M \cdot i1q}{\lambda 2d} = \frac{R2}{L2} \cdot \frac{M \cdot i1q}{M \cdot i1d} = \frac{R2}{L2} \cdot \frac{i1q}{i1d} \quad (5)$$

Thus, the vector control is made by setting the d-axis primary current i1d at $\lambda 2d/M$ and the slip frequency $\omega s$ at a value calculated from Equation (5).

As can be seen from Equation (5), the secondary resistance R2 used in calculating the slip frequency $\omega s$ changes with changes in ambient and rotor temperatures. It is, therefore, required to estimate the secondary resistance change based upon inverter output voltage and to correct the target slip frequency $\omega s$ based upon the secondary resistance change estimated from the inverter voltage. If the secondary resistance changes are ignored, the vector control is degraded for torque control accuracy and torque response time. If the inverter output voltage is used as it is to estimate the secondary resistance change, however, a component related to the primary resistance change will be introduced into the estimated secondary resistance change. For this reason, it is desirable to estimate the secondary resistance change based upon a signal which is independent from the primary resistance change.

The vector control apparatus is arranged to control excitation currents iu, iv and iw that an inverter 10 applies to an induction motor IM by utilizing motor-flux and motor-torque command signals i1d* and i1q*. The induction motor IM has three-phase stator windings which are energized by the output of the inverter 10 and a rotor coupled to drive a mechanical load. The inverter 10 includes a plurality of parallel pairs of series-connected switching element arranged and controlled to convert DC input power into AC output power having adjustable frequency and voltage magnitude. The inverter 10 is controlled by a pulse-width-modulation (PWM) circuit 11 which includes a PWM waveform generator, a triangle waveform generator and a gating circuit. The PWM waveform generator receives a triangle wave signal from the triangle waveform generator and controls the gating circuit to produce gating pulses so as to periodically switch the respective switching elements of the inverter in a predetermined sequence and at a desired frequency.

The vector control apparatus includes a rotor angular velocity sensor 12 connected to a pulse pickup transducer PP. This transducer is associated with the rotor of the induction motor IM for producing a series of electric pulses of a repetition rate directly proportional to the speed of rotation of the rotor. The rotor angular velocity sensor 12 receives the electric pulses and produces an actual rotor angular velocity signal $\omega r$ indicative of the sensed angular velocity $\omega r$ of the rotor. The actual rotor angular velocity signal $\omega r$ is fed to a secondary flux command generator 13 which receives a command signal $\lambda 2d^*/M^*$. The secondary flux command generator 13 produces a command signal i1d* which remains at a value $\lambda 2d^*/M^*$ when the actual rotor angular velocity $\omega r$ is less than a predetermined value and decreases as the actual rotor angular velocity $\omega r$ increases when the actual rotor angular velocity $\omega r$ exceeds the predetermined value. The secondary flux command signal i1d* is fed from the secondary flux command generator 13 to a calculation circuit 16. The actual rotor angular velocity signal $\omega r$ is also fed to a summing circuit 14 which subtracts it from a rotor angular velocity command signal $\omega r^*$ to provide an error output signal. In order to enhance the induction motor control for stability and response time, a proportional plus integral operation is provided on this error signal at a proportional plus integral circuit 15 to produce a torque command signal i1q*. The torque command signal i1q* is applied to the calculation circuit 16. The calculation circuit 16 utilizes the command signals i1d* and i1q* to calculate target values v1d* and v1q* for the d- and q-axis components of the primary voltage applied to the induction motor IM.

The conventional vector control apparatus also includes a coordinate converter 17 which senses two excitation currents iu and iw to the induction motor IM and converts them into d- and q-axis primary current signals i1d and i1q. The d-axis primary current signal i1d is applied to a summing circuit 18 which subtracts it from the secondary flux command signal i1d* fed thereto from the secondary flux command generator 13 to provide an error signal. A proportional plus integral operation is provided on this error signal at a proportional plus integral circuit 19 to produce a signal $\Delta v1d$. The signal $\Delta v1d$ is then applied to a summing circuit 22 which adds it to the command signal v1d* to correct the command signal v1d*. The corrected signal v1d is applied to a coordinate transformer 24.

Similarly, the q-axis primary current signal i1q is applied to a summing circuit 20 which subtracts it from the torque command signal i1q* fed thereto from the proportional plus integral circuit 15 to provide an error signal. A proportional plus integral operation is provided on this error signal in a proportional plus integral circuit 20 to produce a signal $\Delta v1q$. The signal $\Delta v1q$ is applied to a summing circuit 23 which adds it to the signal v1q* to correct the command signal v1q*. The corrected signal v1q is applied to the coordinate transformer 24.

The signals $\Delta v1d$ and $\Delta v1q$ contain components related to changes in the primary and secondary resistances R1 and R2. In order to make corrections free from the influence of the primary resistance changes, the secondary resistance change is corrected based upon a factor containing no component related to a voltage change caused by the primary resistance change. For this purpose, a slip correction circuit 25 calculates a $\delta$-axis primary voltage change $\Delta v1\delta$ expressed in a rotating coordinate system $(\gamma, \delta)$ having its $\gamma$-axis held in coincidence with the direction of the primary current I1. The $\delta$-axis primary voltage change $\Delta v1\delta$ is expressed in an equation containing no factor related to the primary resistance R1.

Figure 2:
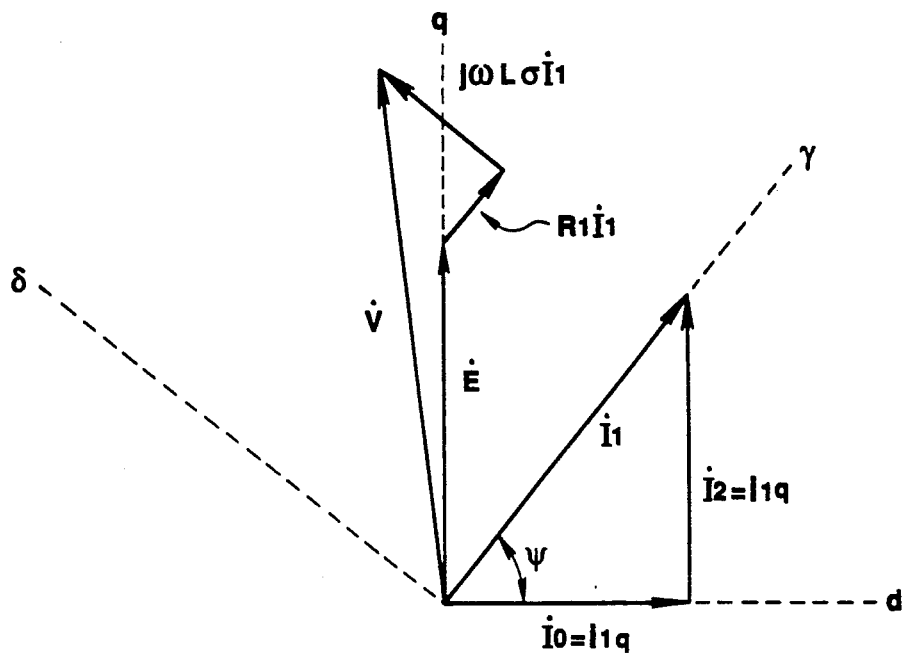
FIG. 2 is a diagram showing the relationship between the primary and secondary currents and voltages expressed in coordinate systems (d, q) and (γ, δ)
Figure 3:
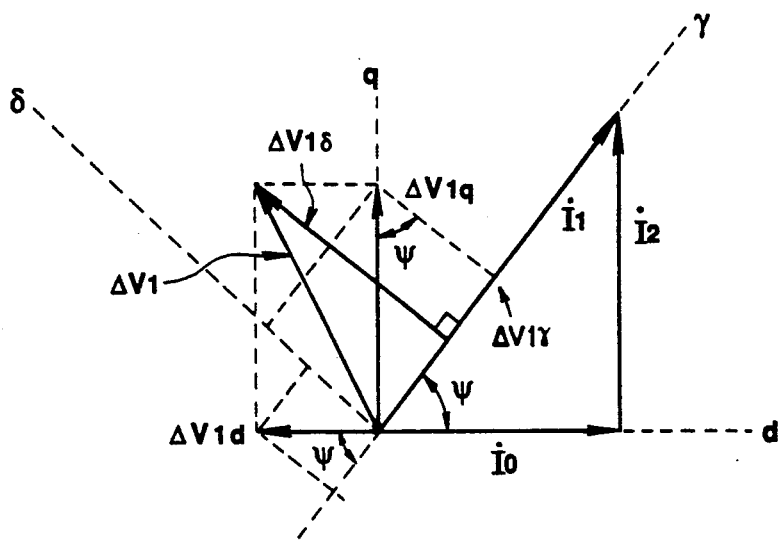
FIG. 3 is a diagram showing the relationships between the primary voltage changes expressed in the coordinate systems (d, q) and (γ,δ)

FIG. 2 is a diagram showing the relationship between the primary and secondary currents and voltages expressed in coordinate systems (d, q) and $(\gamma, \delta)$, and FIG. 3 is a diagram showing the relationship between the primary voltage changes expressed in the coordinate systems (d, q) and $(\gamma, \delta)$. In these figures, the character V indicates the primary voltage, the character E is the secondary voltage, the character $\Delta v1$ is the primary voltage change, the character $\Delta v1\gamma$ is the $\gamma$-axis primary voltage change, the character $\Delta v1\delta$ is the $\delta$-axis primary voltage change, the character $\psi$ is the phase angle of the $\gamma$-axis with respect to the d-axis, the character I0 is the excitation current, and the character I2 is the torque current.

The $\delta$-axis primary voltage change $\Delta v1\delta$ is given as $$\Delta v1\delta = -\Delta v1d \cdot \sin\psi + \Delta v1q \cdot \cos\psi \tag{6}$$

where $\sin\psi = I2/I1 = i1q/i1\gamma$ and $\cos\psi = I0/I1 = i1d/i1\gamma$.

The slip correction circuit 25 calculates a slip frequency change $\Delta\omega s$ caused by the secondary resistance change. This calculation is made based upon the $\delta$-axis primary voltage change $\Delta v1\delta$. The calculated slip frequency change $\Delta\omega s$ is added, in a summing circuit 27, to a slip factor $\omega s^*$ calculated in a slip factor calculation circuit 26. The added value $\omega s^* + \Delta\omega s$, which is used as a slip frequency command signal, is fed to a summing circuit 28 which subtracts it from the actual rotor angular velocity signal $\omega r$ to provide a primary voltage angular frequency command signal $\omega = d\theta/dt$. The primary voltage angular frequency command signal is then integrated in the integrator 29 which integrates it to produce an angular position signal $\theta$ indicative of the angular position of the secondary flux.

The coordinate transformer 24 receives the corrected signals v1d and v1q and produces a signal $|V1|$ indicative of the magnitude of the primary voltage vector V1 and a signal $\psi$ indicative of the phase angle of $\gamma$-axis with respect to the d-axis. The value $|V1|$ is fed directly to the PWM circuit 11, whereas the signal $\psi$ is fed to the PWM circuit 11 through a summing circuit 30 where it is added to the angular position signal $\theta$ fed thereto from the integrating circuit 29. The PWM circuit 11 converts the values $|V1|$ and $\psi + \theta$ into primary voltage command signals causing the inverter I0 to produces three-phase excitation currents iu, iv and iw to the induction motor IM.

The d- and q-axis primary voltage changes contains components related to first and second resistance changes. For this reason, in the conventional vector control apparatus, a $\delta$-axis primary voltage change $\Delta v1\delta$ is calculated based upon the d- and q-axis primary voltage changes. The calculated $\delta$-axis primary voltage change $\Delta v1\delta$ is not subject to the influence of a primary resistance change. The calculated $\delta$-axis primary voltage change $\Delta vi\delta$ is used to calculate a correction factor $\Delta\omega s$.

In the conventional apparatus, however, the vector control is made on an assumption that $i1d = \lambda 2d/M$, that is, the d-axis excitation current $i1d$ is constant without regard to secondary flux control. For this reason, the slip frequency cannot be calculated with high accuracy.

The relationship between the d-axis secondary flux $\lambda 2d$ and the d-axis primary current $i1d$ may be derived from the third row of Equation (1) as $$-\frac{R2}{L2} \cdot M \cdot i1d + \left(\frac{R2}{L2} + P\right) \cdot \lambda 2d - \omega s \cdot \lambda 2q = 0 \tag{7}$$

$$\begin{aligned}
i1d &= \frac{L2}{R2} \cdot \frac{\lambda 2d}{M} \cdot \left(\frac{R2}{L2} + P\right) \\
&= \frac{\lambda 2d}{M} \cdot \left(1 + \frac{L2}{R2} \cdot P\right)
\end{aligned} \tag{8}$$

As can be seen from Equation (8), the d-axis primary current $i1d$ should be controlled in a fashion of time advance of first order with respect to changes in the d-axis secondary flux $\lambda 2d$. In other words, the condition $\lambda 2d = M \cdot i1d$ cannot be established when the secondary flux command $\lambda 2d^*$ changes.

Figure 4:
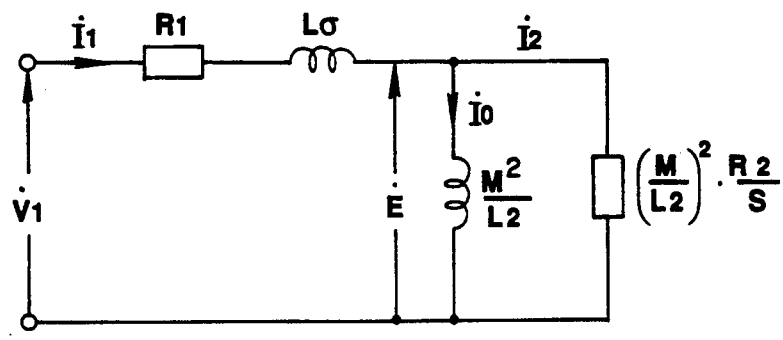
FIG. 4 is a circuit diagram showing an equivalent circuit for an induction motor.
Figure 5:
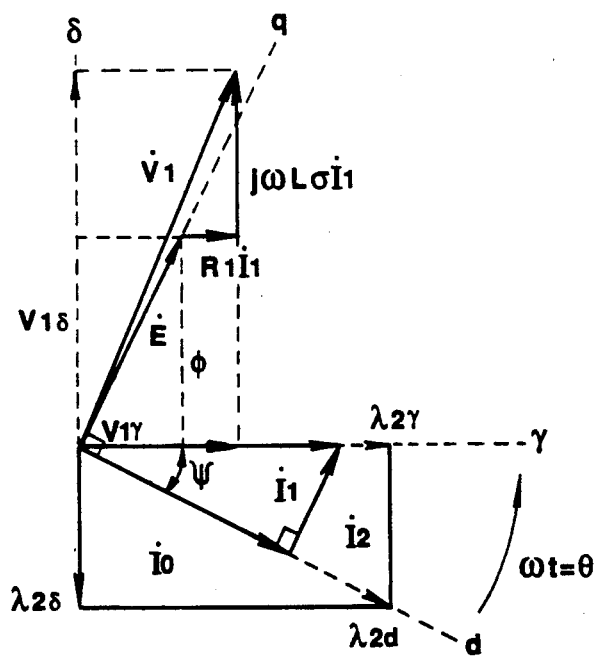
FIG. 5 is a diagram showing the vectors of the currents produced in the equivalent circuit of FIG. 4.

The principles of the invention will be described with reference to FIGS. 4 and 6. FIG. 4 shows an asymmetrical T-I type equivalent circuit for an induction motor. FIG. 5 is a diagram showing the vectors of the currents produced in the equivalent circuit of FIG. 4. Assuming now that the $\gamma$-axis is held in coincidence with the direction of the primary current I1, the $\gamma$-axis primary current $i1\gamma$ is equal to the primary current I1 and the $\delta$-axis primary current $i1\delta$ is zero. The induction motor voltage equation expressed in the two-dimensional Cartesian coordinate system $(\gamma, \delta)$ rotating at the same angular velocity as the angular velocity of the primary voltage to the induction motor IM is given as $$\begin{bmatrix} v1\gamma \\ v1\delta \\ 0 \\ 0 \end{bmatrix} = \begin{bmatrix} R1 + L\sigma P & -L\sigma\omega & \left(\frac{M}{L2}\right)P & \left(-\frac{M}{L2}\right)\omega \\ L\sigma\omega & R1 + L\sigma P & \left(\frac{M}{L2}\right)\omega & \left(\frac{M}{L2}\right)P \\ \left(-\frac{R2}{L2}\right)M & 0 & \left(\frac{R2}{L2}\right) + P & -\omega s \\ 0 & -\left(\frac{R2}{L2}\right)M & \omega s & \left(\frac{R2}{L2}\right) + P \end{bmatrix} \begin{bmatrix} i1\gamma \\ i1\delta \\ \gamma 2\lambda \\ \lambda 2\delta \end{bmatrix} \tag{9}$$

From the third and fourth rows of Equation (9), the following equations are derived:

$$-\frac{R2}{L2} \cdot M \cdot i1\gamma + \left(\frac{R2}{L2} + P\right) \cdot \lambda 2\gamma - \omega s \cdot \lambda 2\delta = 0 \tag{10}$$

$$\omega s \cdot \lambda 2\gamma + \left(\frac{R2}{L2} + P\right) \cdot \lambda 2\delta = 0 \tag{11}$$

From Equation (11), the following equation is derived:

$$R2/L2 + P = -\lambda 2\gamma \cdot \omega s/\lambda 2\delta \tag{12}$$

Substituting Equation (12) into Equation (10) gives the following equation:

$$-\frac{R2}{L2} \cdot M \cdot i1\gamma - \frac{\lambda 2\gamma^2}{\lambda 2\delta} \cdot \omega s - \lambda 2\delta \cdot \omega s = 0$$

$$-\frac{R2}{L2} \cdot M \cdot i1\gamma - \left(\frac{\lambda 2\gamma^2 + \lambda 2\delta^2}{\lambda 2\delta}\right) \cdot \omega s = 0$$

Thus, $$\omega s = -\frac{\lambda 2\delta}{\lambda 2\gamma^2 + \lambda 2\delta^2} \cdot \frac{R2}{L2} \cdot M \cdot i1\gamma \quad (13)$$

The d- and q-axis secondary fluxes $\lambda 2\gamma$ and $\lambda 2\delta$ are $$\lambda 2\gamma = \lambda 2d \cos\psi \quad (14)$$

$$\lambda 2\delta = -\lambda 2\delta \sin\psi \quad (15)$$

$$\lambda 2\gamma^2 + \lambda 2\delta^2 = \lambda 2d^2 \quad (16)$$

Substituting Equations (14), (15) and (16) into Equation (13) gives the following equation:

$$\begin{aligned}\omega s &= \frac{R2}{L2} \cdot \frac{M \cdot i1\gamma \cdot \sin\psi}{\lambda 2d} \\ &= \frac{R2}{L2} \cdot \frac{M \cdot i1q}{M \cdot i1d} \\ &= \frac{R2}{L2} \cdot \frac{i1q}{i1d}\end{aligned} \quad (17)$$

It can be seen from Equation (17) that the slip frequency s can be calculated from the same equation as Equation (5) used to calculate the slip frequency in the conventional vector control apparatus if the $\gamma$- and $\delta$-axis primary currents $i1\gamma$ and $i1\delta$ are controlled to establish conditions of $i1\gamma = I1$ and $i1\delta = 0$ with the $\gamma$-axis being held in coincidence with the direction of the primary current I1. If the vector control is made with regard to secondary flux control, that is, the d-axis secondary flux $\lambda 2d$ is not equal to $M \cdot i1d$, the slip frequency $\omega s$ is $$\omega s = \frac{R2}{L2} \cdot \frac{i1q}{(\lambda 2d/M)} \quad (18)$$

Considerations are made to the voltage commands $v1\gamma^*$ and $v1\delta^*$. Since the vector control is made on the coordinate system $(\gamma, \delta)$ with $i1\gamma^* = I1$ and $i1\delta^* = 0$, the following equation can be derived from Equation (9):

$$\begin{bmatrix} v1\gamma \\ v1\delta \end{bmatrix} = \begin{bmatrix} R1 \\ L\sigma \cdot \omega 0 \end{bmatrix} i1\gamma + L\sigma \begin{bmatrix} P \cdot i1\gamma \\ P \cdot i1\delta \end{bmatrix} + \frac{M}{L2}\begin{bmatrix} 0 & -\omega 0 \\ \omega 0 & 0 \end{bmatrix}\begin{bmatrix} \lambda 2\gamma \\ \lambda 2\delta \end{bmatrix} + \frac{M}{L2}\begin{bmatrix} P \cdot \lambda 2\gamma \\ P \cdot \lambda 2\delta \end{bmatrix} \quad (19)$$

Equation (19) may be modified to remove the terms affixed to the differentiating operator P.

$$\begin{bmatrix} v1\gamma^* \\ v1\delta^* \end{bmatrix} = \begin{bmatrix} R1 \\ L\sigma \cdot \omega 0 \end{bmatrix} i1\gamma^* + \frac{M}{L2}\begin{bmatrix} 0 & -\omega 0 \\ \omega 0 & 0 \end{bmatrix}\begin{bmatrix} \lambda 2\gamma^* \\ \lambda 2\delta^* \end{bmatrix} \quad (20)$$

When vector control conditions are satisfied, the following equations are given $$\begin{aligned}\lambda 2\gamma^* &= \lambda 2d^* \cdot \cos\psi \\ &= M \cdot \frac{\lambda 2d^*}{M} \cdot \cos\psi\end{aligned} \quad (21)$$

$$\begin{aligned}\lambda 2\delta^* &= -\lambda 2d^* \cdot \sin\psi \\ &= -M \cdot \frac{\lambda 2d^*}{M} \cdot \sin\psi\end{aligned} \quad (22)$$

Thus, $$v1\gamma^* = R1 \cdot i1\gamma^* + \frac{M^2}{L2} \cdot \omega 0 \cdot \frac{\lambda 2d^*}{M} \cdot \sin\psi \quad (23)$$

$$v1\delta^* = L\sigma \cdot \omega 0 \cdot i1\gamma^* + \frac{M^2}{L2} \cdot \omega 0 \cdot \frac{\lambda 2d^*}{M} \cdot \cos\psi \quad (24)$$

The term $P \cdot i1\gamma$ affixed to $L\sigma$ in Equation (19) cannot be ignored when a rapid change occurs in the torque command $i1g^*$ and/or when the excitation current command $i1d^*$ changes. With regard to the term $P \cdot i1\gamma$, the voltage commands $v1\gamma^*$ and $v1\delta^*$ are $$\begin{aligned}v1\gamma^* &= R1 \cdot i1\gamma^* + L\sigma \cdot P \cdot i1\gamma^* + \frac{M^2}{L2} \cdot \omega 0 \cdot \frac{\lambda 2d^*}{M} \cdot \sin\psi \\ &= R1\left(1 + \frac{L\sigma}{R1} \cdot P\right) i1\gamma^* + \frac{M^2}{L2} \cdot \omega 0 \cdot \frac{\lambda 2d^*}{M} \cdot \sin\psi\end{aligned} \quad (25)$$

$$v1\delta^* = L\sigma \cdot \omega 0 \cdot i1\gamma^* + \frac{M^2}{L2} \cdot \omega 0 \cdot \frac{\lambda 2d^*}{M} \cdot \cos\psi \quad (26)$$

Considerations are made to a secondary flux change with a secondary resistance change. The following equations are derived from the third and fourth rows of Equation (9):

$$-\frac{R2}{L2} \cdot M \cdot i1\gamma + \left(\frac{R2}{L2} + P\right) \cdot \lambda 2\gamma - \omega s \cdot \lambda 2\delta = 0 \quad (27)$$

$$\omega s \cdot \lambda 2\gamma + \left(\frac{R2}{L2} + P\right) \cdot \lambda 2\delta = 0 \quad (28)$$

Multiplying Equations (27) and (28) by L2/R2 gives $$-M \cdot i1\gamma + \left(1 + \frac{L2}{R2} \cdot P\right) \lambda 2\gamma - \frac{L2}{R2} \cdot \omega s \cdot \lambda 2\delta = 0 \quad (29)$$

$$\frac{L2}{R2} \cdot \omega s \cdot \lambda 2\gamma + \left(1 + \frac{L2}{R2} \cdot P\right) \lambda 2\delta = 0 \quad (30)$$

Multiplying Equation (29) by $(1+L2 \cdot P/R2)$ gives $$-M \cdot \left(1 + \frac{L2}{R2} \cdot P\right) \cdot i1\gamma + \left(1 + \frac{L2}{R2} \cdot P\right)^2 \cdot \lambda 2\gamma - \frac{L2}{R2} \cdot \omega s \cdot \left(1 + \frac{L2}{R2}\right) \cdot \lambda 2\delta = 0 \quad (31)$$

Multiplying Equation (30) by $L2 \cdot s/R2$ gives $$\left(\frac{L2}{R2}\cdot\omega s\right)^2\cdot\lambda 2\gamma+\frac{L2}{R2}\cdot\omega s\cdot\left(1+\frac{L2}{R2}\cdot P\right)\cdot\lambda 2\delta=0 \quad (32)$$

Adding Equation (31) to Equation (32) gives $$\lambda 2\gamma=\frac{M\cdot\left(1+\frac{L2}{R2}\cdot P\right)\cdot i1\gamma}{\left(1+\frac{L2}{R2}\cdot P\right)^2+\left(\frac{L2}{R2}\cdot\omega s\right)^2} \quad (33)$$

Multiplying Equation (29) by $L2\cdot\omega s/R2$ gives $$-M\cdot\frac{L2}{R2}\cdot\omega s\cdot i1\gamma+\frac{L2}{R2}\cdot\omega s\cdot\left(1+\frac{L2}{R2}\cdot P\right)\cdot\lambda 2\gamma-\left(\frac{L2}{R2}\cdot\omega s\right)^2\cdot\lambda 2\delta=0 \quad (34)$$

Multiplying Equation (30) by $(1+L2\cdot P/R2)$ gives $$\frac{L2}{R2}\cdot\omega s\cdot\left(1+\frac{L2}{R2}\cdot P\right)\cdot\lambda 2\gamma+\left(1+\frac{L2}{R2}P\right)^2\cdot\lambda 2\delta=0 \quad (35)$$

Subtracting Equation (34) from Equation (35) gives $$\lambda 2\delta=\frac{-M\cdot\frac{L2}{R2}\cdot\omega s\cdot i1\gamma}{\left(1+\frac{L2}{R2}\cdot P\right)^2+\left(\frac{L2}{R2}\cdot\omega s\right)^2} \quad (36)$$

It is now assumed that the currents are controlled to respective command values and thus $i1\gamma^*=i1\gamma$, $i1\delta^*=i1\delta=0$, $i1d^*=i1d$, and $id1^*=i1q$. Since $R2=(1+K)\cdot R2^*$ where K is the secondary resistance change, the term $L2\cdot\omega s/R2$ used in Equations (33) and (36) may be expressed as $$\frac{L2}{R2}\cdot\omega s=\frac{L2^*}{(1+K)\cdot R2^*}\cdot\frac{R2^*}{L2^*}\cdot\frac{i1q^*}{\frac{\lambda 2d^*}{M^*}} \quad (37)$$

$$=\frac{1}{(1+K)}\cdot\frac{i1q^*}{\frac{\lambda 2d^*}{M^*}}$$

Since the excitation current is controlled as shown in Equation (8), the following equation is obtained:

$$i1d^*=\frac{\lambda 2d^*}{M^*}\cdot\left(1+\frac{L2^*}{R2^*}\cdot P\right) \quad (38)$$

Assuming now that the secondary time constant $L2/R2$ of the term $(1+L2\cdot P/R2)$ is equal to $L2^*/R2^*$, that is, the secondary resistance R2 is unchanged in a short time, the following equation is given:

$$1+\frac{L2}{R2}\cdot P=\frac{i1d^*}{\frac{\lambda 2d^*}{M^*}} \quad (39)$$

Substituting Equation (39) into Equations (33) and (36) gives $$\lambda 2\gamma=\lambda 2d^*\cdot\frac{(1+K)^2\cdot i1d^*\cdot i1\gamma^*}{(1+k)^2\cdot i1d^{*2}+i1q^{*2}} \quad (40)$$

$$\lambda 2\delta=-\lambda 2d^*\cdot\frac{(1+K)\cdot i1q^*\cdot i1\gamma^*}{(1+k)^2\cdot i1d^{*2}+i1q^{*2}} \quad (41)$$

Thus, the secondary flux command values are given as $$\lambda 2\gamma^*=\lambda 2d^*\cdot\cos\psi=\lambda 2d^*\cdot\frac{i1q^*}{i1\gamma^*} \quad (42)$$

$$\lambda 2\delta^*=-\lambda 2d^*\cdot\sin\psi=-\lambda 2d^*\cdot\frac{i1q^*}{i1\gamma^*} \quad (43)$$

$$\psi=\tan^{-1}\frac{i1q^*}{i1d^*} \quad (44)$$

Using Equations (40) and (42), the following equation is given:

$$=\lambda 2\gamma^*\cdot\left(\frac{(1+K)^2\cdot i1\gamma^{*2}}{(1+k)^2\cdot i1d^{*2}+i1q^{*2}}-1\right) \quad (45)$$

Using Equations (41 and 43), the following equation is given $$=\lambda 2\delta^*\cdot\left(\frac{(1+K)\cdot i1\gamma^{*2}}{(1+k)^2\cdot i1d^{*2}+i1q^{*2}}-1\right) \quad (46)$$

When the secondary flux changes, the primary voltage is $$v1\gamma=R1\cdot i1\gamma^*-\frac{M^*}{L2^*}\cdot\omega 0(\lambda 2\delta^*+\Delta\lambda 2\delta) \quad (47)$$

$$v1\delta=L\sigma^*\cdot\omega 0\cdot i1\gamma^*+\frac{M^*}{L2^*}\cdot\omega 0(\lambda 2\gamma^*+\Delta\lambda 2\gamma) \quad (48)$$

Since the primary voltage command value is expressed by Equations (23) and (24), the voltage changes are derived from Equations (23), (24), (47) and (48) along with Equations (45) and (46).

$$\begin{aligned}\Delta v1\gamma &= v1\gamma-v1\gamma^* \\ &= -\frac{M^*}{L2^*}\cdot\omega 0\cdot\Delta\lambda 2\delta \\ &= -\frac{M^*}{L2^*}\cdot\omega 0\cdot \\ &\quad \lambda 2\gamma^*\left(\frac{(1+K)\cdot i1\gamma^{*2}}{(1+k)^2\cdot i1d^{*2}+i1q^{*2}}-1\right) \\ &= \frac{M^{*2}}{L2^*}\cdot\omega 0\cdot\frac{\lambda 2d^*}{M^*}\cdot \\ &\quad \frac{i1q^*}{i1\gamma^*}\left(\frac{(1+K)\cdot i1\gamma^{*2}}{(1+k)^2\cdot i1d^{*2}+i1q^{*2}}-1\right)\end{aligned} \quad (49)$$

-continued
$$\Delta v1\delta = v1\delta - v1\delta^* \quad (50)$$
$$= \frac{M^*}{L2^*} \cdot \omega 0 \cdot \Delta\lambda 2\delta$$
$$= \frac{M^*}{L2^*} \cdot \omega 0 \cdot \lambda 2\gamma^* \left( \frac{(1+K)^2 \cdot i1\gamma^{*2}}{(1+k)^2 \cdot i1d^{*2} + i1q^{*2}} - 1 \right)$$
$$= \frac{M^{*2}}{L2^*} \cdot \omega 0 \cdot \frac{\lambda 2d^*}{M^*} \cdot \frac{i1q^*}{i1\gamma^*} \left( \frac{(1+K)^2 \cdot i1\gamma^{*2}}{(1+k)^2 \cdot i1d^{*2} + i1q^{*2}} - 1 \right)$$

Since the γ-axis primary current v1γ contains a component related to the term R1·i1γ*, it contains a component related to a voltage change caused by a change in the primary resistance R1. With regard to a change in the primary resistance R1, Equation (47) can be modified as $$v1\gamma = (1 + K1)R1^* \cdot i1\gamma^* - \frac{M}{L2} \cdot \omega 0(\lambda 2\delta^* + \Delta\lambda 2\delta) \quad (51)$$
$$= R1^* \cdot i1\gamma^* - \frac{M}{L2} \omega 0 \cdot \lambda 2\delta^* + K1 \cdot R1^* \cdot i1\gamma^* - \frac{M}{L2} \cdot \omega 0 \cdot \Delta\lambda 2\delta$$

Thus,
$$\Delta v1\gamma = v1\gamma - v1\gamma^* \quad (52)$$
$$= K1 \cdot R1^* \cdot i1\gamma^*$$
$$= \frac{M^{*2}}{L2^*} \cdot \omega 0 \cdot \frac{\lambda 2d^*}{M^*} \cdot \frac{i1q^*}{i1\gamma^*} \left( \frac{(1+K) \cdot i1\gamma^{*2}}{(1+k)^2 \cdot i1d^{*2} + i1q^{*2}} - 1 \right)$$

where K1 is a primary resistance change.

Although the term Δv1γ, which contains a component related to a change in the primary resistance R1, is not suitable for use in correcting for a change in the secondary resistance R2, the δ-axis primary voltage change Δv1δ contains no component related to the primary resistance R1 and it may be considered as a voltage change component caused by a secondary resistance change. It is, therefore, possible to eliminate the influence of the primary resistance R1 by detecting the change Δv1δ of the δ-axis primary voltage v1δ and using the detected change Δv1δ to correct the secondary resistance change. As a result, the secondary resistance correction can be free from the influence of the primary resistance R1 which changes with changes in temperature. Normally, the influence of voltage drops caused by the primary resistance R1 increases at slow induction motor speeds. Since the δ-axis primary voltage v1δ contains no component related to a voltage drop caused by the primary resistance R1, however, it is possible to provide an accurate secondary resistance correction at slow induction motor speeds. In addition, it is possible to estimate the primary resistance R1 by detecting the γ-axis primary voltage change Δv1γ which is a voltage component caused only by a change in the primary resistance R1 when the secondary resistance correction is made based upon the δ-axis primary voltage change Δv1δ, The secondary resistance change K is given by modifying Equation (50) as $$1 + K = \left( \frac{\frac{M^{*2}}{L2^*} \cdot \omega 0 \cdot \frac{\lambda 2d^*}{M^*} \cdot i1d^* \cdot i1q^{*2} + i1\gamma^* \cdot i1q^{*2} \cdot \Delta v1\delta}{\frac{M^{*2}}{L2^*} \cdot \omega 0 \cdot \frac{\lambda 2d^*}{M^*} \cdot i1d^* \cdot i1q^{*2} - i1\gamma^* \cdot i1d^{*2} \cdot \Delta v1\delta} \right)^{\frac{1}{2}} \quad (53)$$

Thus, if the δ-primary voltage change Δv1δ is detected, the secondary resistance change K can be calculated from Equation (53).

Considerations are made to identification of the primary resistance R1 and the excitation inductance M during induction motor idling operation. The ratio of the excitation current to the torque current changes to change the primary voltage with changes in the excitation inductance M. Since the primary voltage changes with changes in the secondary resistance R2, it is impossible to distinct a primary voltage change caused by an excitation inductance change from a primary voltage change caused by a secondary resistance change. Since the torque current i1q is zero during induction motor idling operation, however, the primary voltage change is free from the influence of the secondary resistance change. It is, therefore, possible to make an excitation inductance correction using the primary voltage change detected during induction motor idling operation.

Figure 6:
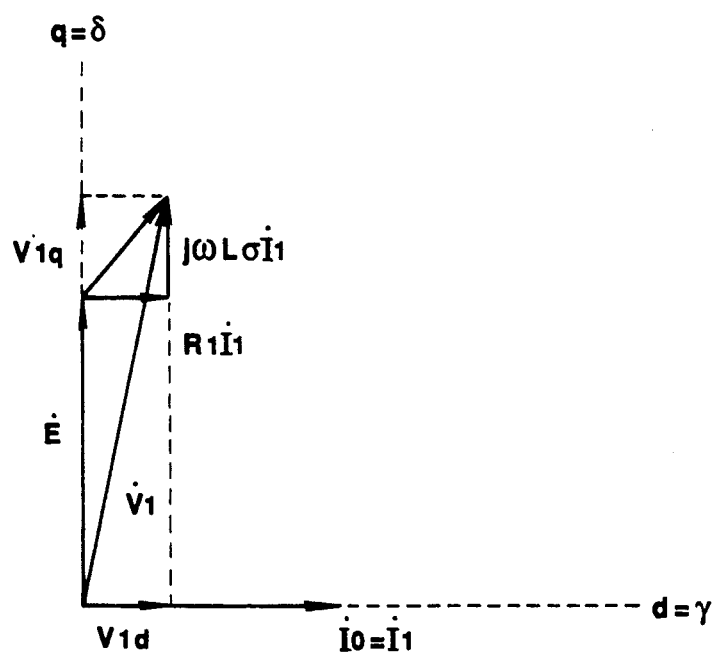
FIG. 6 is a diagram showing the vectors of the voltages produced in an equivalent circuit for an idling induction motor.

FIG. 6 is a diagram showing the vectors of the voltage produced in a T-I type equivalent circuit for an idling induction motor. Since the torque current i1q is zero during induction motor idling operation, the d-axis and q-axis of the coordinate system (d,q) are in coincidence with the γ-axis and δ-axis of the coordinate system (γ, δ), respectively. Thus, considerations are made to the coordinate system (d, q). During induction motor idling operation where the q-axis primary current i1q is zero, the primary current is derived from Equation (19) with the term P being ignored as $$v1d = R1 \cdot i1d \quad (54)$$

$$v1q = L\sigma \cdot \omega 0 \cdot i1d + \frac{M^2}{L2} \cdot \omega 0 \cdot \frac{\lambda 2d^*}{M} \quad (55)$$

It is now assumed that i1d*=i1d since the d-axis primary current i1d is controlled to the command value i1d*, AM is the excitation inductance change, and the change in the equivalent leakage inductance Lσ is small and can be ignored.

The command voltage value during induction motor idling operation is expressed as $$v1d^* = R1^* \cdot i1d^* \quad (56)$$

$$v1q^* = L\sigma^* \cdot \omega 0 \cdot i1d^* + \frac{M^{*2}}{L2^*} \cdot \omega 0 \cdot \frac{\lambda 2d^*}{M^*} \quad (57)$$

Using the primary resistance change A1 and the excitation inductance change AM, the primary voltage can be expressed as $$v1d = (1 + A1) \cdot R1^* \cdot i1d^* \quad (58)$$

-continued $$v1q = L\sigma^* \cdot \omega 0 \cdot i1d^* + (1 + AM) \cdot \frac{M^{*2}}{L2^*} \cdot \omega 0 \cdot \frac{\lambda 2d^*}{M^*} \quad (59)$$

The d- and q-axis primary voltage changes $\Delta v1d$ and $\Delta v1q$ are expressed in Equations (60) and (61) derived from Equations (56), (57), and (58) and (59), and the primary resistance change A1 and the excitation inductance AM are expressed in Equations (62) and (63) derived from Equations (60) and (61).

$$\Delta v1d = v1d - v1d^*$$
$$= A1 \cdot R1^* \cdot i1d^* \quad (60)$$

$$\begin{aligned} v1q &= v1q - v1q^* \\ &= AM \cdot \frac{M^{*2}}{L2^*} \omega 0 \frac{\lambda 2d^*}{M^*} \end{aligned} \quad (61)$$

$$A1 = \frac{\Delta v1d}{R1^* \cdot i1d^*} \quad (62)$$

$$AM = \frac{\Delta v1q}{\frac{M^{*2}}{L2^*} \cdot \omega 0 \cdot \frac{\lambda 2d^*}{M^*}} \quad (63)$$

Since $\lambda 2d^* = M^* \cdot i1d^*$ when the excitation command is unchanged, the excitation inductance AM is $$AM = \frac{\Delta v1q}{\frac{M^{*2}}{L2^*} \cdot \omega 0 \cdot i1d^*} \quad (64)$$

As can be seen from the foregoing, it is possible to identify the primary resistance R1 and the excitation inductance M using the primary voltage change during induction motor idling operation. That is, the primary resistance change A1 can be derived from the d-axis primary voltage change $\Delta v1d$, and the excitation inductane change AM can be derived from the q-axis primary voltage change $\Delta v1q$.

If the secondary resistance command R2* is in coincidence with the actual secondary resistance R2, the slip frequency command $\omega s^*$ may be calculated from Equation (18). However, the actual secondary resistance R2 changes with changes in temperature. According to the invention, the $\delta$-axis primary voltage change $\Delta v1\delta$ is utilized to calculate the secondary resistance change K and the calculated secondary resistance change K is utilized to correct the secondary resistance command R2*. The corrected secondary resistance command is used in calculating the slip frequency command $\omega s^*$. That is, the slip frequency command $\omega s^*$ is calculated from the following equation:

$$\omega s^* = (1 + K) \cdot \frac{R2^*}{L2^*} \cdot \frac{i1q^*}{\lambda 2d^*/M^*} \quad (65)$$

The primary resistance R1 changes with changes in temperature. However, the secondary resistance correction is free from the influence of the primary resistance change since the $\delta$-axis primary voltage change $\Delta v1\delta$ contains no component related to the primary resistance, as can be seen from Equation (50). In this respect, the invention is similar to the vector control circuit of FIG. 1. However, the conventional vector control apparatus is quite different from the invention in that the vector control is made only on a single coordinate system (d, q).

Figure 7:
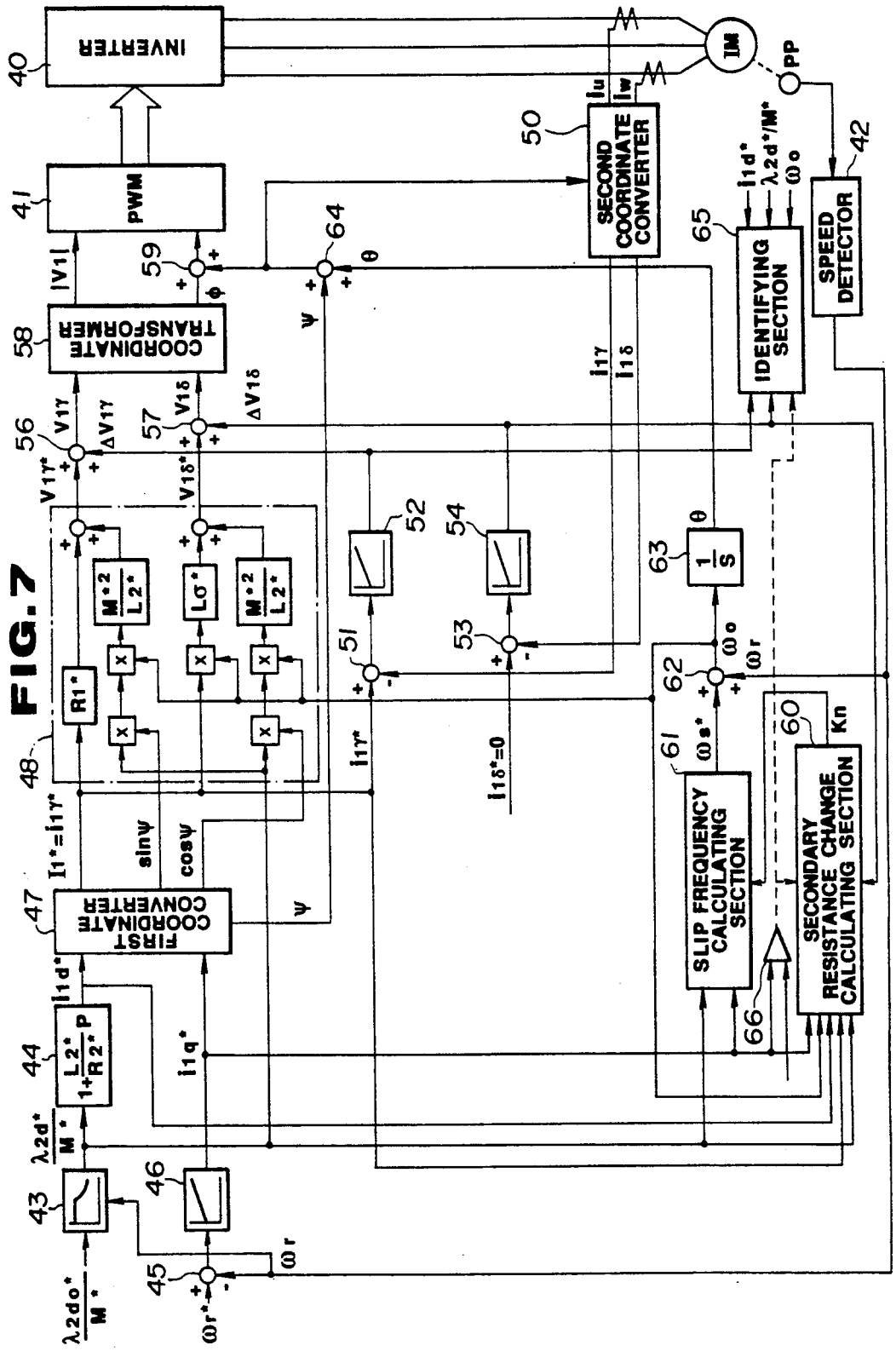
FIG. 7 is a schematic diagram showing one embodiment of an induction motor vector control apparatus made in accordance with the invention.

Referring to FIG. 7, there is shown a schematic block diagram of a vector control apparatus embodying the invention. The vector control apparatus is arranged to control excitation currents iu, iv and iw that an inverter 40 applies to an induction motor IM by utilizing motor-flux and motor-torque command current signals i1d* and i1q*. The induction motor IM has three-phase stator windings which are energized by the output of the inverter 40 and a rotor coupled to drive a mechanical load. The inverter 40 includes a plurality of parallel pairs of series-connected switching element arranged and controlled to convert DC input power into AC output power having adjustable frequency and voltage magnitude. The inverter 40 is controlled by a pulse-width-modulation (PWM) circuit 41 which includes a PWM waveform generator, a triangle waveform generator and a gating circuit. The PWM waveform generator receives a triangle wave signal from the triangle waveform generator and controls the gating circuit to produce gating pulses so as to periodically switch the respective switching elements of the inverter in a predetermined sequence and at a desired frequency.

The vector control apparatus includes a rotor speed sensor 42 connected to a pulse pickup transducer PP. This transducer is associated with the rotor of the induction motor IM for producing a series of electric pulses of a repetition rate directly proportional to the speed of rotation of the rotor. The rotor speed sensor 42 receives the electric pulses and produces an actual rotor angular velocity signal $\omega r$ indicative of the sensed rotor angular velocity. The actual rotor angular velocity signal $\omega r$ is fed to a calculation circuit 43 which receives a command signal $\lambda 2d^*/M^*$. The calculation circuit 43 produces a command signal which remains at a value $\lambda 2d^*/M^*$ when the actual speed signal $\omega r$ is less than a predetermined value and decreases as the actual speed signal $\omega r$ increases when the actual speed signal $\omega r$ exceeds the predetermined value. The command signal is applied from the calculation circuit 43 to a calculation circuit 44 where a secondary flux command signal i1d* is calculated from Equation (8) as $$i1d^* = \frac{\lambda 2d^*}{M^*} \left(1 + \frac{L2^*}{R2^*} P\right)$$

The actual speed signal $\omega r$ is also applied to a summing circuit 45 which substracts it from a speed command signal $\omega r^*$ to provide an error output signal. In order to enhance the induction motor control for stability and response time, a proportional plus integral operation is provided on this error signal in a proportional plus integral circuit 46 to produce a torque command signal i1q*. These command signals i1d* and i1q* are applied to a first coordinate converter 47.

The first coordinate converter 47 utilizes the command signals i1d* and i1q* to calculate a $\gamma$-axis primary current command value i1$\gamma$* and a phase angle $\psi$ of the $\gamma$-axis of the coordinate system ($\gamma$, $\delta$) held in coincidence with the direction of the primary current I1 with respect to the d-axis of the coordinate system (d, q) held in coincidence with the direction of the secondary flux as $$\psi = \tan^{-1}(i1q^*/i1d^*),\ I1 = \sqrt{i1d^{*2} + i1q^{*2}}$$

The calculated phase angle $\psi$ is fed to a calculation circuit 48 which utilizes the calculated phase angle in the form of $\sin\psi$ and $\cos\psi$, along with the calculated value $\lambda 2d^*/M^*$ fed from the calculation circuit 44 and the primary voltage angular frequency $\omega 0$, to calculate $\gamma$- and $\delta$-axis primary voltage command values $v1\gamma^*$ and $v1\delta^*$ from Equations (23) and (24).

The vector control apparatus also includes a second coordinate converter 50 which senses two excitation currents iu and iw supplied from the inverter 40 to the induction motor IM and converts them into $\gamma$- and $\delta$-axis primary current signals $i1\gamma$ and $i1\delta$. The $\gamma$-axis primary current $i1\gamma$ is supplied to a summing circuit 51 which substracts it from the $\gamma$-axis primary current command signal $i1\gamma^*$ to provide an error signal. A proportional plus integral operation is provided on this error signal in a proportional plus integral circuit 52 to produce a $\gamma$-axis primary voltage change signal $\Delta v1\gamma$. The signal $\Delta v1\gamma$ is applied to a summing circuit 56 which adds it to the command signal $v1\gamma^*$ to correct the command signal $vi\gamma^*$. The corrected signal $vi\gamma$ is applied to a coordinate transformer 58.

Similarly, the $\delta$-axis primary current signal $i1\delta$ is fed to a summing circuit 53 which substracts it from a $\delta$-axis primary current command signal $i1\delta^*$ to provide an error signal. A proportional plus integral operation is provided on this error signal in a proportional plus integral circuit 54 to produce a $\delta$-axis primary voltage change signal $\Delta v1\delta$. The signal $\Delta v1\delta$ is then applied to a summing circuit 57 which adds it to the $\delta$-axis primary voltage command signal $v1\delta^*$ to correct the command signal $v1\delta^*$. The corrected signal $v1\delta$ is applied to the coordinate transformer 58.

The coordinate transformer 58 receives the corrected signals $v1\gamma$ and $v1\delta$ and produces a signal $\|V1\|$ indicative of the magnitude of the primary voltage vector V1 and a value $\phi$ indicative of the phase angle of the primary voltage vector V1 with respect to the $\gamma$-axis. The value $\|V1\|$ is fed directly to the PWM circuit 41, whereas the value $\phi$ is fed to the PWM circuit 41 through a summing circuit 59 where it is added to an value $\theta\ (=\omega 0\cdot t)$ to be described later. The PWM circuit 41 converts the values $\|V1\|$ and $\phi+\theta$ into primary voltage command signals causing the inverter 40 to produces three-phase excitation currents iu, iv and iw to the induction motor IM.

The numeral 60 designates a secondary resistance change calculation circuit which utilizes the command signal $\lambda 2d^*/M^*$ fed thereto from the calculation circuit 43, the command signal $i1d^*$ fed thereto from the calculation circuit 44, the command signal $i1q^*$ fed thereto form the proportion plus integral circuit 46, the primary voltage angular velocity $\omega 0$ fed thereto from a summing circuit to be described later, the command signal $i1\gamma^*$ fed thereto from the first coordinate converter 47 and the command signal $\Delta i1\delta$ fed thereto from the proportional plus integral circuit 54 to calculate a secondary resistance change K from Equation (53). The calculated secondary resistance change K is fed to a slip angle frequency calculation circuit 61 which utilizes it, along with the command signals $\lambda 2d^*/M^*$ and $i1q^*$, to calculate a slip frequency $\omega s$ from Equation (65). If a digital computer is used to make calculations at the circuits of FIG. 7, the slip frequency $\omega s$ is calculated as follows:

The secondary resistance change K and the slip frequency $\omega s$ are calculated in synchronism with a series of clock pulses. The slip factor calculation circuit 61 uses the secondary resistance value $R2n-1$ calculated in the last or (n−1) th cycle of execution of the program to calculate the secondary resistance value R2n in the present or nth cycle of execution of the program. Assuming now that Kn is the secondary resistance change value calculated in the nth cycle of execution of the program, R2n is the secondary resistance value calculated in the nth cycle of execution of the program, and a predetermined value $R2^*$ is assigned to an initial value R20 for the secondary resistance value R2n, successive calculations are performed as follows:

First calculation:
$R21 = (1 + K1)\cdot R20 = (1 + K1)\cdot R2^*$
Second calculation:
$R22 = (1 + K2)\cdot R21 = (1 + K2)\cdot(1 + K1)\cdot R2^*$
.
.
Nth calculation:
$R2n = (1 + Kn)\cdot R2n - 1 = (1 + Kn)\cdot$
$(1 + Kn - 1)\ldots(1 + K1)\cdot R2^*$ Assuming that $\omega sn$ is the slip frequency value calculated in the nth cycle of execution of the program, the value $\omega sn$ is given as $$\omega sn = (1+kn)\cdot\omega s(n-1) \tag{66}$$

The value $\omega s(n-1)$ is calculated and stored in the (n−1)th cycle of execution of the program and it is used, along with the value Kn, to calculate the value $\omega sn$ from Equation (66). The initial value $\omega s1$ for the slip frequency $\omega s$ is given as $$\omega s1 = (1+K1)\cdot R2^*\cdot(1/L2^*)\cdot i1q^*/(\lambda 2d^*/M^*)$$

The calculated slip frequency $\omega s^*$ is fed to the summing circuit 62 which adds it to the sensed rotor angular velocity $\omega r$ to provide a primary voltage angular frequency command signal $\omega 0$ which is then fed to an integrator circuit 63. The integrator circuit converts it into an angular position signal $\theta$ indicative of the angular position of the secondary flux. The angular position signal $\theta$ is then fed to the summing circuit 64.

The numeral 65 designates an identification circuit operable in response to an output from a comparator 66. The comparator 66 compares the torque command signal $i1q^*$ with a predetermined value, for example, equal to 5% of the rated torque current. When the torque command signal $i1q^*$ is less than the predetermined value, the induction motor IM is idling and the comparator 66 produces a command signal causing the identification circuit 65 to operate. The command signal is also applied to disable the secondary resistance change calculation circuit 60 since the vector control is subject to no influence of the secondary resistance change while the induction motor IM is idling. The identification circuit 65 measures the $\gamma$-axis primary voltage change signal $\Delta v1\gamma$ and the d-axis primary current command signal $i1d^*$ during induction motor idling operation and utilizes them to calculate a primary resistance change A1 from Equation (62). The calculated primary resistance change A1 is utilized to identify the primary resistance R1. The identification circuit 65 also measures the $\delta$-axis primary voltage signal $\Delta v1\delta$, the primary voltage angular frequency $\omega 0$ and the signal $\lambda 2d^*/M^*$ and utilizes them to calculate an excitation inductance change $\Delta M$ from Equation (63). The calculated excitation inductance change $\Delta M$ is used to identify the excitation inductance $M^2/L2$.

In order to calculate the $\gamma$-axis primary voltage command $v1\gamma^*$, from Equation (25), with regard to the differentiating operator P, the calculation circuit 48 may be arranged to use the term $R1^*\cdot(1+L\sigma/R1\cdot P)$ in place of the term $R1^*$. This is effective to enhance the vector control for control accuracy and response time.

Figure 8:
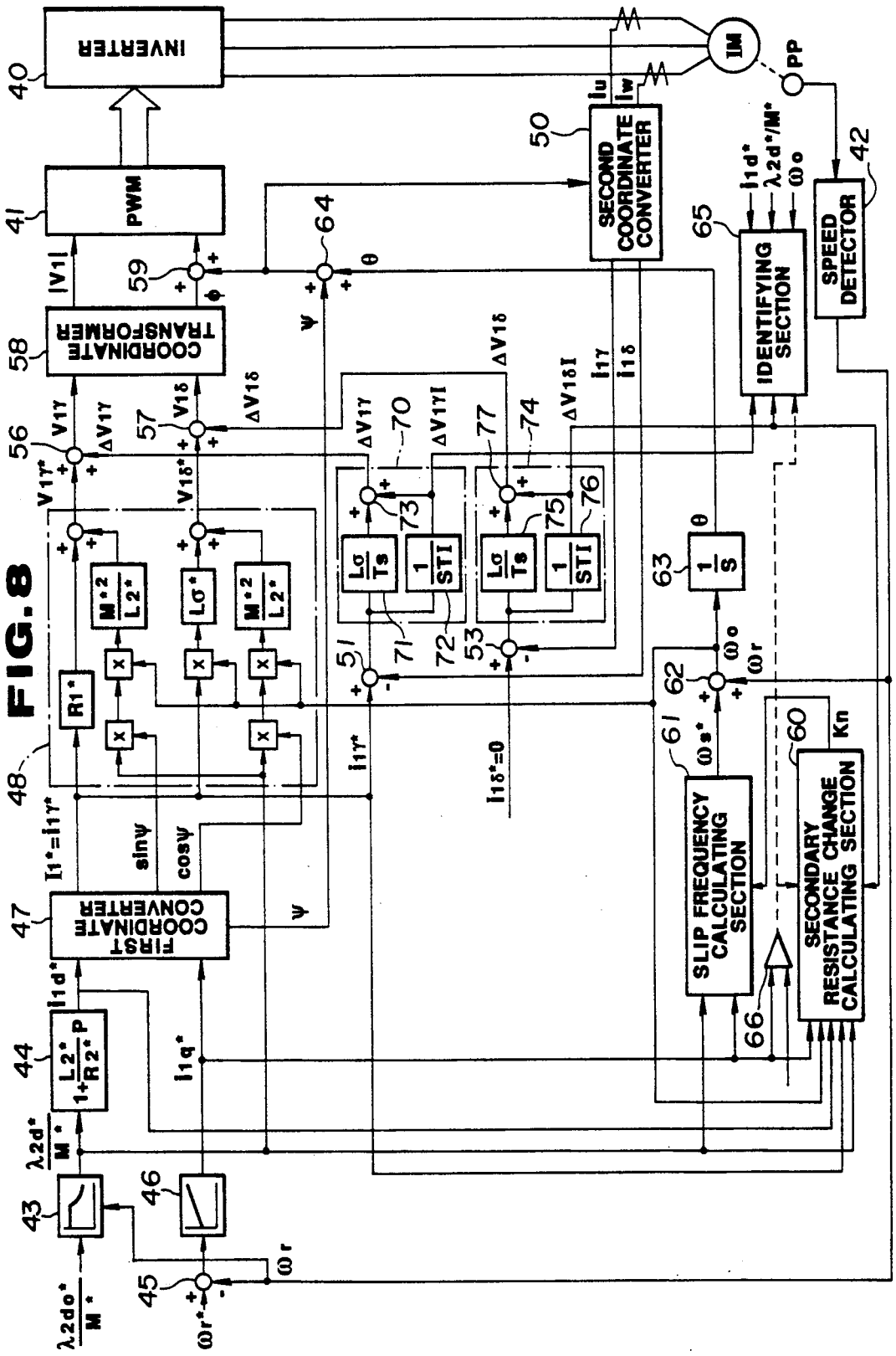
FIG. 8 is a schematic diagram showing a second embodiment of the induction motor vector control apparatus of the invention.

Referring to FIG. 8, there is shown a second embodiment of the vector control apparatus of the invention. The second embodiment is similar to that of the first embodiment except for the arrangement of the proportional plus integral circuits 70 and 74. Like reference numerals have been applied to FIG. 8 with respect to the equivalent components shown in FIG. 7.

With the secondary flux change being ignored, the following equations can be derived from Equation (19):

$$v1\gamma = R1\cdot i1\gamma + L\sigma\cdot P\cdot i1\gamma + M^2/L2\cdot\omega 0\cdot(\lambda 2d/M)\cdot\sin\psi \quad (67)$$

$$v1\delta = L\sigma\cdot\omega 0\cdot i1\gamma + L\sigma\cdot P\cdot i1\delta + M^2/L2\cdot\omega 0\cdot(\lambda 2d/M)\cdot\\ \cdot\cos\psi \quad (68)$$

As can be seen from Equations (67) and (68), each of the $v1\gamma$ and $v1\delta$ changes by a value corresponding to the time rate of change of the corresponding one of the $v1\gamma$ and $v1\delta$ with a rapid change in the primary current. That is, the $\delta$-axis primary voltage change contains a component related to the secondary resistance change and also a component related to the time rate of change of the primary current, whereas the $\gamma$-axis primary voltage change contains a component related to the primary resistance and excitation inductance changes and also a component related to the time rate of change of the primary current.

In this embodiment, both of (1) the primary voltage changes ($\Delta v1\gamma$ and $\Delta v1\delta$) which contain the terms $L\sigma\cdot P\cdot i1\gamma$ and $L\sigma\cdot P\cdot i1\delta$, and (2) the primary voltage changes ($\Delta v1\gamma I$ and $\Delta v1\delta I$) which do not contain the terms $L\sigma\cdot P\cdot i1\gamma$ and $L\sigma\cdot P\cdot i1\delta$ are calculated. The primary voltage changes $\Delta v1\gamma$ and $\Delta v1\delta$ are used to control the primary voltage. The primary voltage changes $\Delta v1\gamma I$ and $\Delta v1\delta I$ are used to correct the secondary resistance change and identify the primary resistance.

The proportional plus integral circuit 70 includes a proportional element 71, an integral element 72 and a summing circuit 73. The proportional element 71 calculates a value $(i1\gamma^*-i1\gamma)\times L\sigma/Ts$ corresponding to $L\sigma\cdot P\cdot i1\gamma$ where Ts is the calculation time period. The integral element 72 integrates the value $(i1\gamma^*-i1\gamma)$. The integrated value is added to the calculated value $(i1\gamma^*-i1\gamma)\times L\sigma/Ts$ in the summing circuit 73. The added value $\Delta v1\gamma$ is fed to the summing circuit 56. Similarly, the proportional plus integral circuit 74 includes a proportional element 75, an integral element 76 and a summing circuit 77. The proportional element 75 calculates a value $(i1\delta^*-i1\delta)\times L\sigma/Ts$ corresponding to $L\sigma\cdot P\cdot i1\delta$. The integral element 76 integrates the value $(i1\delta^*-i1\delta)$. The integrated value is added to the calculated value $(i1\delta^*-i1\delta)\times L\sigma/Ts$ in the summing circuit 77. The added value $\Delta v1\delta$ is fed to the summing circuit 57. The values $(i1\gamma^*-i1\gamma)/Ts$ and $(i1\delta^*-i1\delta)/Ts$ are calculated by differentiating elements.

With this arrangement, the values $\Delta v1\gamma I$ and $\Delta v1\delta I$ are free from the influence of a sudden primary current change. It is, therefore, possible to improve the accuracy with which the secondary resistance is corrected and the primary current is identified.

Figure 9:
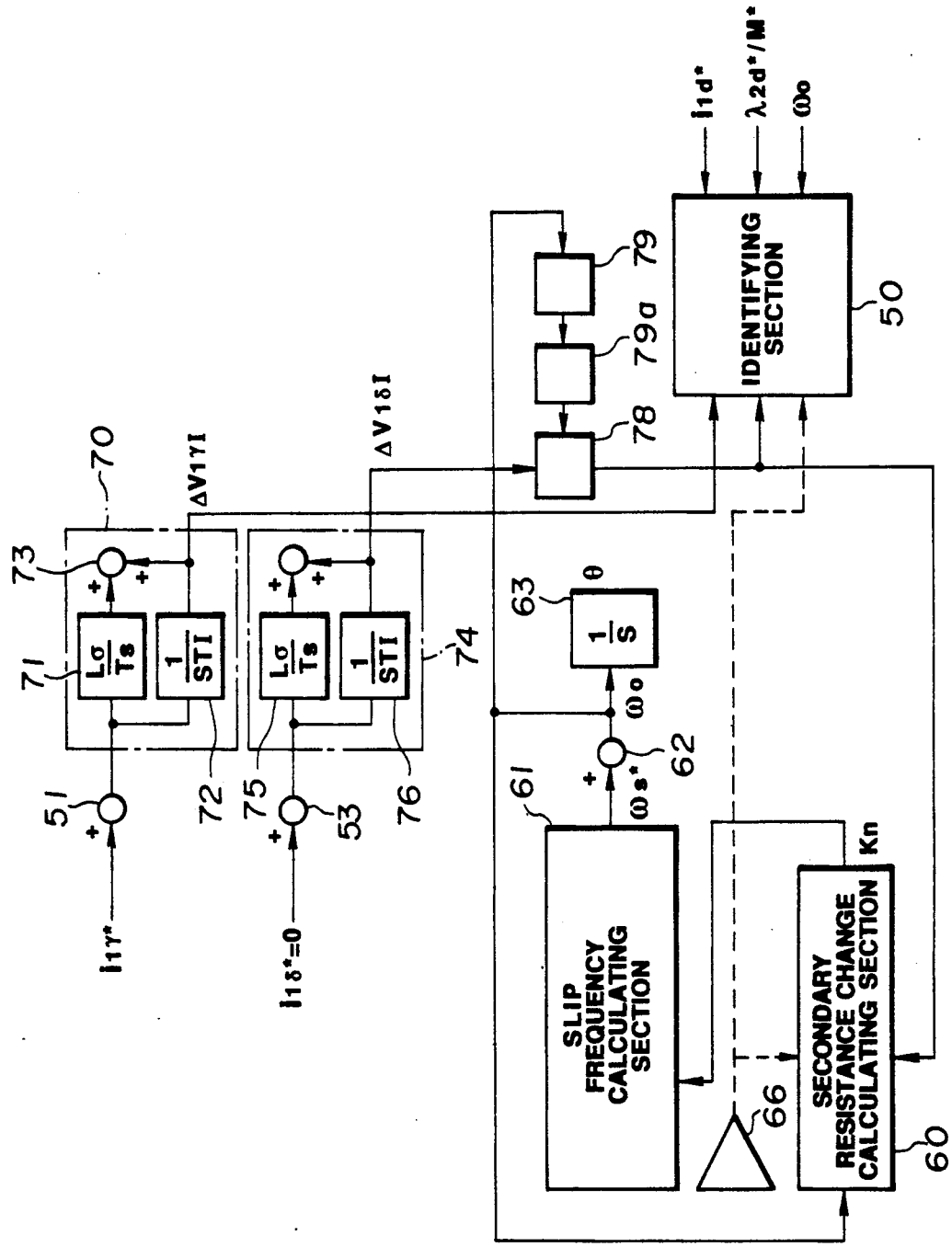
FIG. 9 is a schematic diagram showing a modified form of the second embodiment of the invention.

Referring to FIG. 9, there is shown a modified form of the second embodiment where the $\delta$-axis primary voltage change signal $\Delta v1\delta I$ is fed to the secondary resistance change calculation circuit 60 through a filter 78 which provides a time lag of first order to the $\delta$-axis primary voltage change signal $\Delta v1\delta I$. Since the $\delta$-axis voltage change signal $\Delta v1\delta I$ contains ripples particularly at low frequencies, it is desirable to remove the ripples to provide a stable secondary resistance change correction. The time constant of the filter 78 is varied in inverse proportion to the primary voltage angular frequency $\omega 0$. The filter transfer function G(S) is represented as $G(S)=1/(1+ST1)$ where $T1=1/f0=2\pi\omega 0$, T1 is the time constant of the filter, f0 is the output frequency of the inverter 40, and $\omega 0$ is the primary angular frequency. For this purpose, a time constant setting circuit 79 receives a primary voltage angular frequency signal $\omega 0$ from the summing circuit 62 to vary the time constant of the filter 78 in inverse proportion to the primary voltage angular frequency $\omega 0$. It is desirable to provide a limiter 79a between the filter 78 and the time constant setting circuit 79 for varying the filtering effect according to the induction motor speed.

Figure 10:
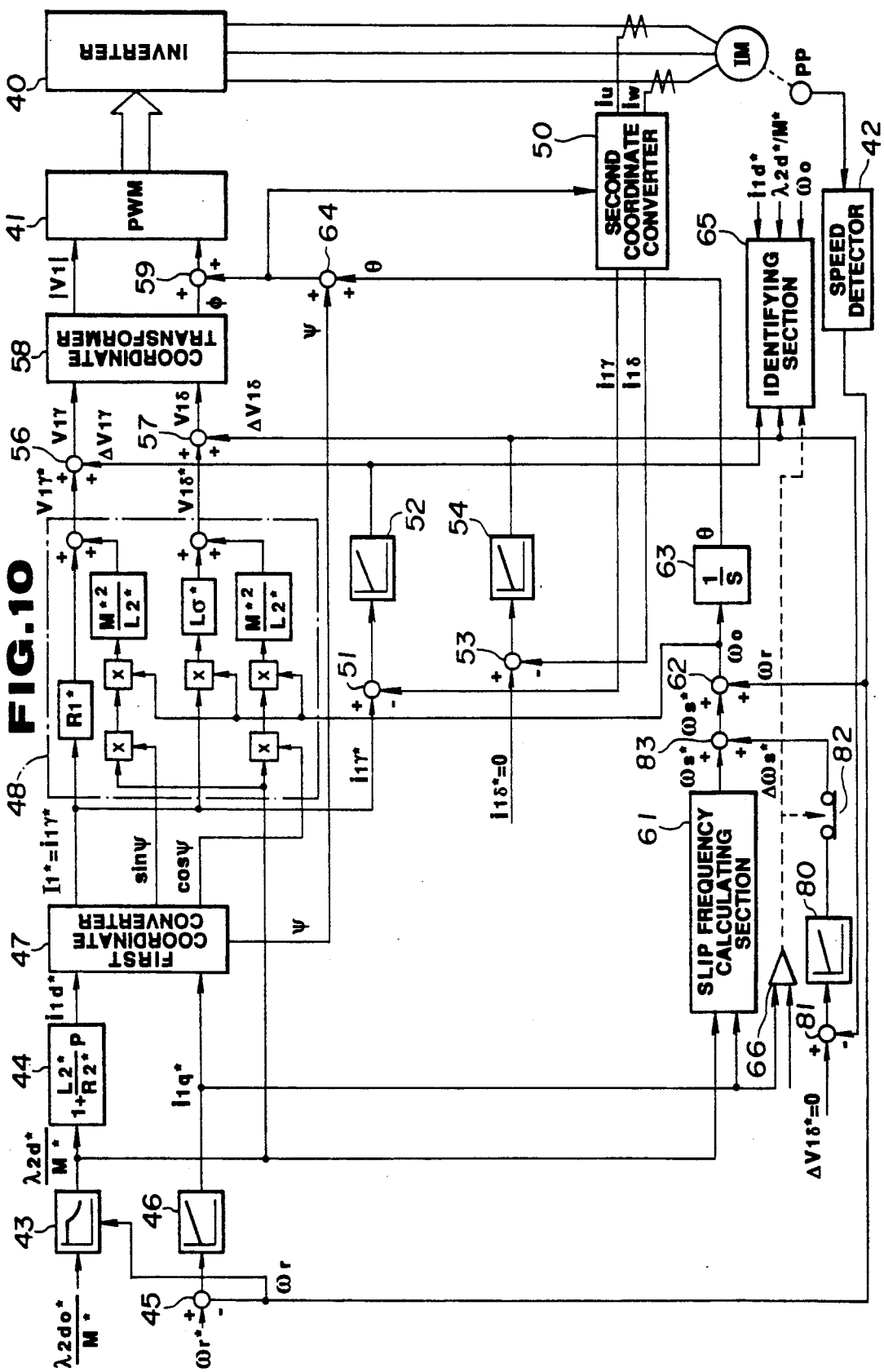
FIG. 10 is a schematic diagram showing a third embodiment of the induction motor vector control apparatus of the invention.

Referring to FIG. 10, there is shown a third embodiment of the vector control apparatus of the invention. The third embodiment is similar to that of the first embodiment except that the secondary resistance change calculation circuit 60 is removed and replaced with a proportional plus integral circuit 80. Like reference numerals have been applied to FIG. 10 with respect to the equivalent components shown in FIG. 7.

The proportional plus integral circuit 80 receives an input from a summing circuit 81 which subtracts the $\delta$-axis primary voltage change $\Delta v1\delta$ fed from the proportional plus integral circuit 54 from a $\delta$-axis primary voltage change command value $\Delta v1\delta^*$ $(=0)$. The proportional plus integral circuit 80 calculates a slip frequency change $\Delta\omega s$ from the present slip frequency command value $\omega s^*$. The calculated slip frequency change $\Delta\omega s$ is fed from the proportional plus integral circuit 80 through a switch 82 to a summing circuit 83 where it is added to the slip frequency command value $\omega s^*$ fed from the slip frequency calculation circuit 61. The switch 82 opens to interrupt the signal from the proportional plus integral circuit 80 to the summing circuit 83 in response to the command signal from the comparator 66, that is, when the induction motor IM is idling. The slip frequency calculation circuit 61 calculates the slip frequency command value $\omega s^*$ from the following equation with the second resistance R2 being assumed to be unchanged from its command value:

$$\omega_s = \frac{R2^*}{L2^*}\cdot\frac{i1q^*}{\lambda 2d^*/M^*}$$

The slip frequency command value $\omega s^*$ is fed from the summing circuit 83 to the summing circuit 62. With this arrangement, the slip frequency command value is automatically corrected according to the secondary resistance. It is to be understood that the proportion plus integral circuits 52 and 54 may be replaced with the proportional plus integral circuit 70 and 74 of FIG. 8 in order to improve the accuracy with which the secondary resistance is corrected and the primary current is identified.

Figure 11:
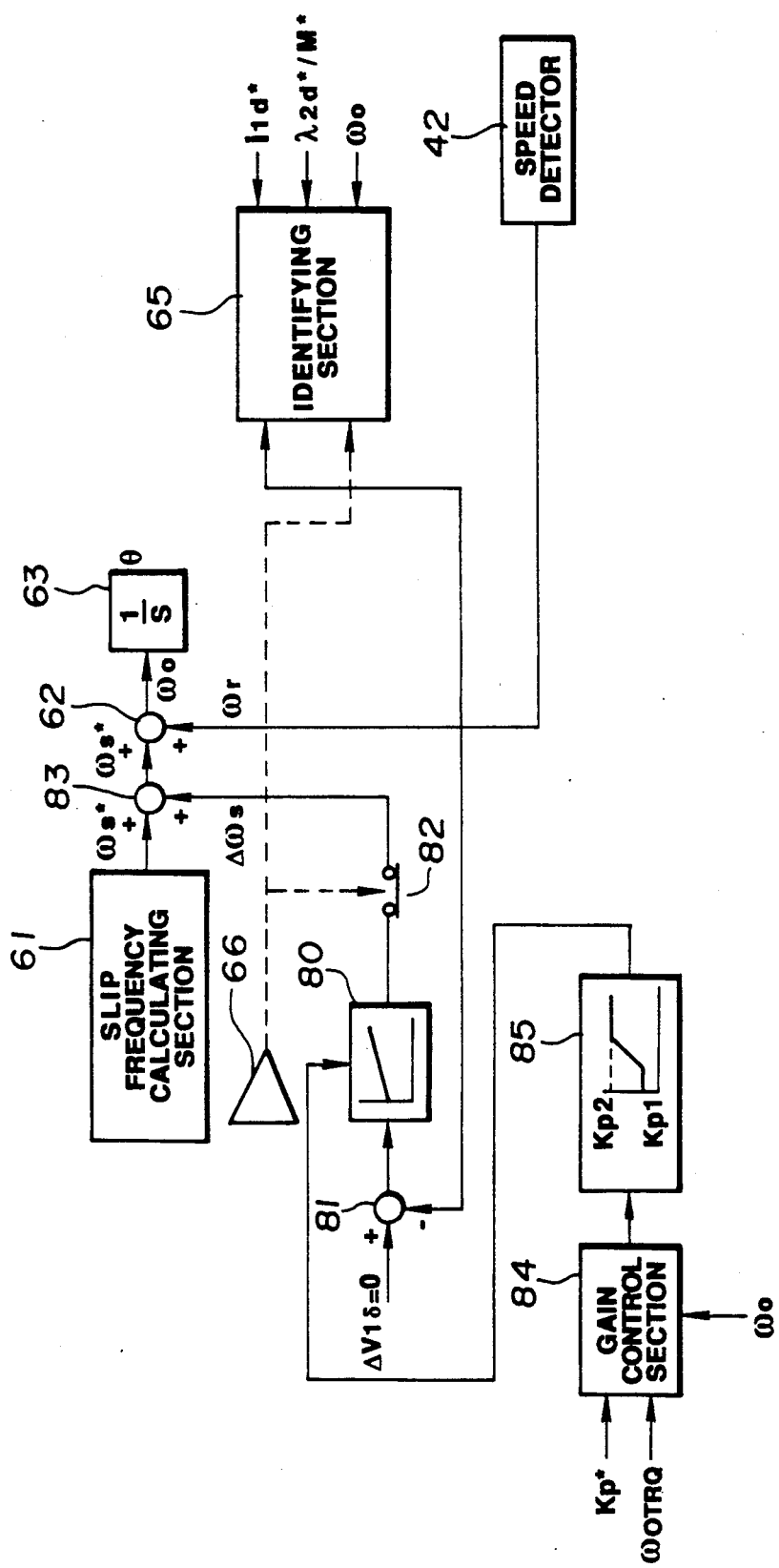
FIG. 11 is a schematic diagram showing a modified form of the third embodiment of the invention.

Referring to FIG. 11, there is shown a modified form of the third embodiment. The δ-axis primary voltage change $\Delta v1\delta$ caused by a secondary resistance change is given by Equation (50). As can be seen from Equation (50), the δ-axis primary voltage change $\Delta v1\delta$ changes in direct proportion to the primary angular frequency $\omega 0$. For this reason, the primary angular frequency $\omega 0$ and thus the δ-axis primary voltage change $\Delta v1\delta$ are very small in a low frequency region or a motor locked condition. Therefore, the secondary resistance correction response is slow since the values $\Delta v1\delta$ and $\Delta v1\delta I$ are very small. This modification improves the response time by providing a gain control circuit 84 which varies the gain Kp of the proportional plus integral circuit 80 in inverse proportion to the primary angular frequency $\omega 0$ as $Kp=Kp^* \times \omega 0TRQ\omega 0$ where $Kp^*$ is the gain of the proportional plus integral circuit 80 at $\omega 0TRQ$, and $\omega 0TRQ$ is the ground angular frequency. It is preferable to enhance the operation stability of the proportional plus integral circuit 80 by providing a limiter 85 which limits the gain Kp between lower and upper limits Kp1 and Kp2. The primary angular frequency $\omega 0$ is set at $\omega 0TRQ$ and the gain Kp is set at $Kp^*$ if the primary angular frequency $\omega 0$ is in a steady output region.

Figure 12:
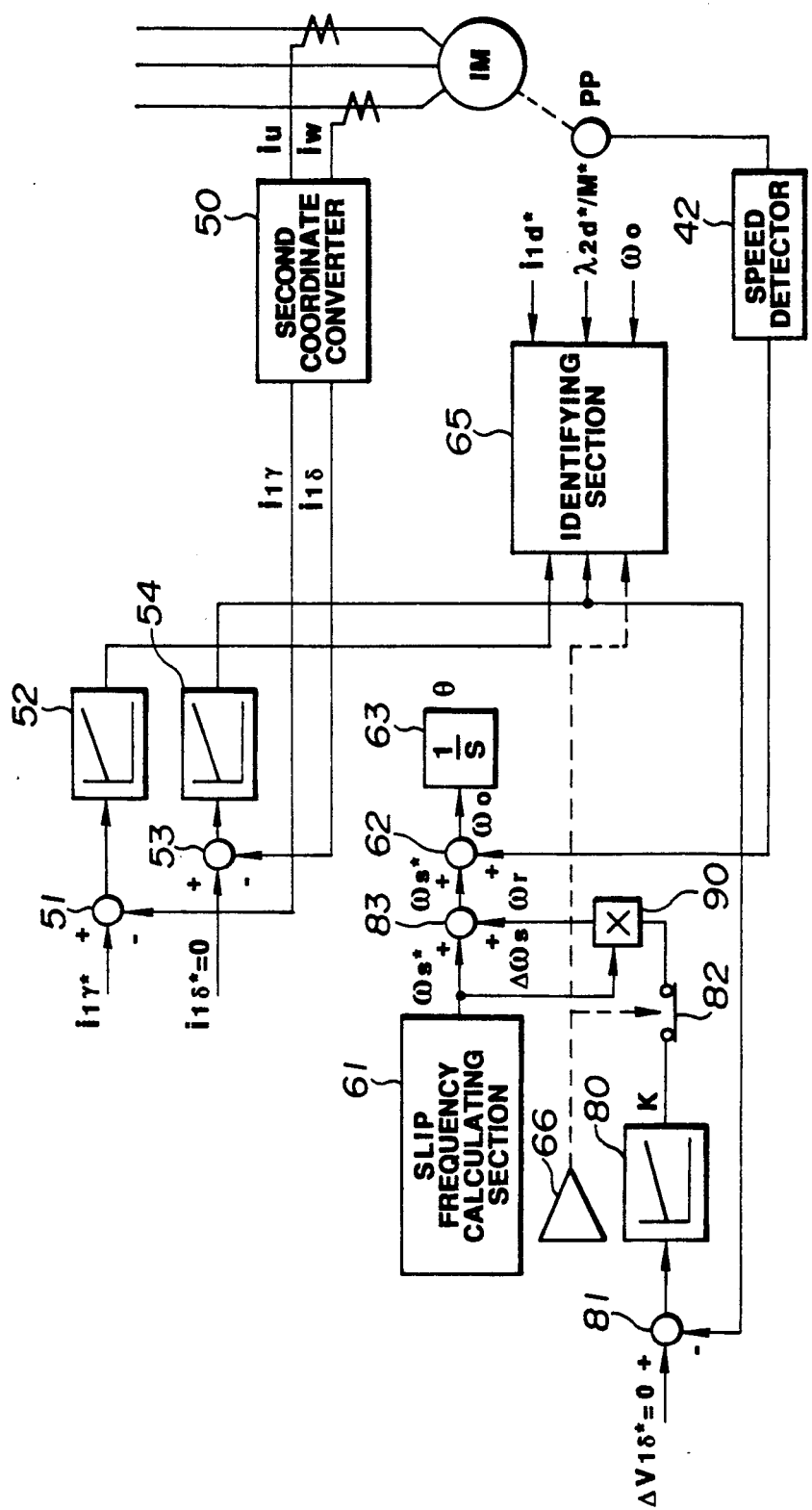
FIG. 12 is a schematic diagram showing a fourth embodiment of the induction motor vector control apparatus of the invention.

Referring to FIG. 12, there is shown a fourth embodiment of the vector control apparatus of the invention. The fourth embodiment is similar to that of the third embodiment except that a multiplying circuit 90 is provided. Like reference numerals have been applied to FIG. 12 with respect to the equivalent components shown in FIG. 10.

When a sudden change occurs in the torque current command signal i1q* or the excitation current command signal λ2d*/M*, the slip frequency $\omega s$ will change. With the use of a proportional plus integral circuit arranged to produce a slip frequency change signal $\Delta \omega s$, the slip frequency change signal should change with a change in the command signal i1q* or λ2d*/M*. For this reason, the correction for secondary resistance changes has a slow response to a change in the torque current command signal i1q* or the excitation current command signal λ2d*/M*. This problem can be eliminated by arranging the secondary resistance correcting circuit in a manner to directly output the secondary resistance change K. Using the secondary resistance change K, the slip frequency is expressed as $$\omega_s = \frac{(1+K) \cdot R2^*}{L2^*} \cdot \frac{i1q^*}{\lambda 2d^*/M^*} \quad (70)$$

$$= \frac{R2^*}{L2^*} \cdot \frac{i1q^*}{\lambda 2d^*/M} + K \cdot \frac{R2^*}{L2^*} \cdot \frac{i1q^*}{\lambda 2d^*/M}$$

$$= \omega_s + \Delta \omega_s$$

Assuming that the secondary resistance change K is a constant, the slip frequency change $\Delta \omega s$ changes with a change in the command signal i1q* or λ2d*/M*, as can be seen from Equation (70).

The proportional plus integral circuit 80 receives an input from the summing circuit 81 which subtracts the δ-axis primary voltage change $\Delta v1\delta$ fed from the proportional plus integral circuit 54 from a δ-axis primary voltage change command value $\Delta v1\delta^*$ (=0). The proportional plus integral circuit 80 calculates a secondary resistance change K. The calculated secondary resistance change K is fed from the proportional plus integral circuit 80 through the switch 82 to the multiplying circuit 90 where it is multiplied by the slip frequency command signal $\omega s^*$ fed from the slip frequency calculation circuit 61. The product $\Delta \omega s = K \times \omega s^*$ is added to the slip frequency command signal $\omega s^*$ fed from the slip frequency calculation circuit 61 in the summing circuit 83. The output of the summing circuit 83 is coupled to the summing circuit 62. The switch 82 opens to interrupt the signal from the proportional plus integral circuit 80 to the multiplying circuit 90 in response to the command signal from the comparator 66, that is, when the induction motor IM is idling.

Figure 13:
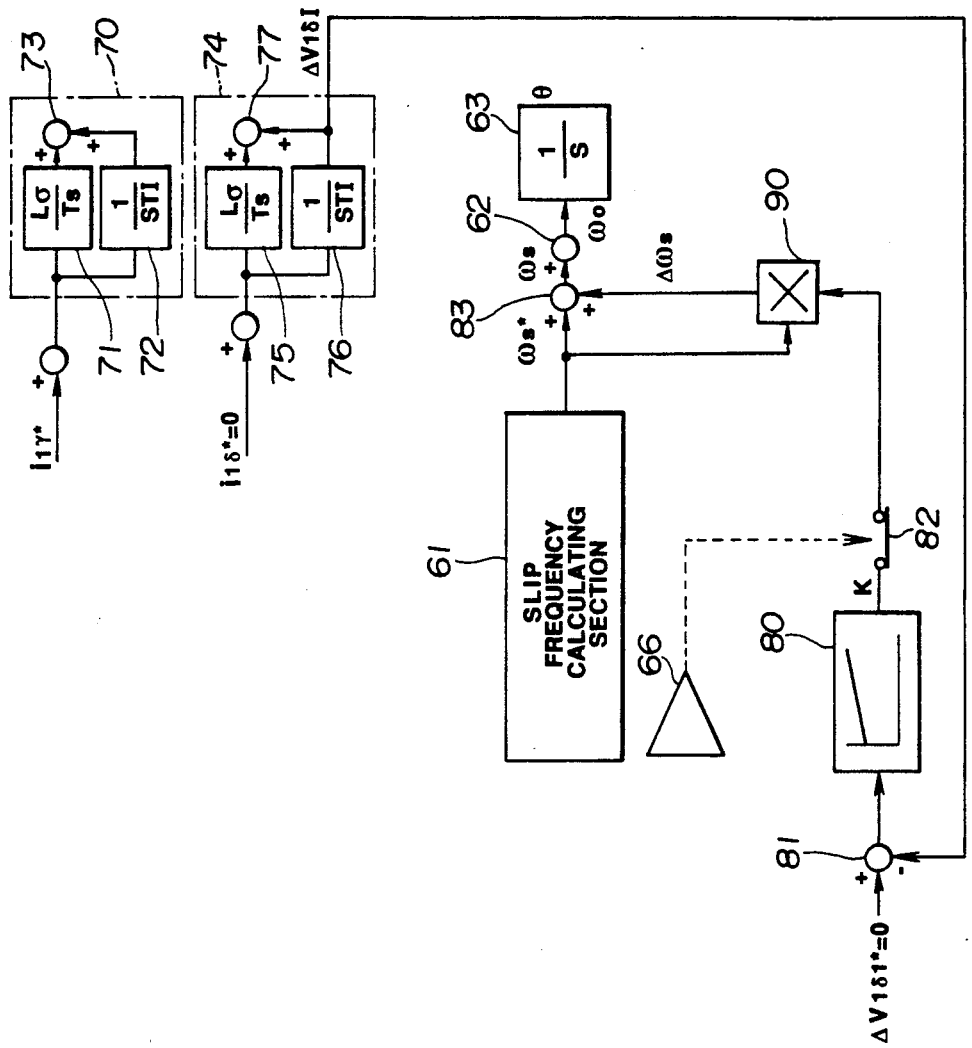
FIG. 13 is a schematic diagram showing a modified form of the fourth embodiment of the invention.

Referring to FIG. 13, there is shown a modification of the fourth embodiment. In this modification, the proportion plus integral circuits 52 and 54 are replaced with the proportional plus integral circuit 70 and 74 of FIG. 8 in order to improve the accuracy with which the secondary resistance is corrected and the primary current is identified.

Figure 14:
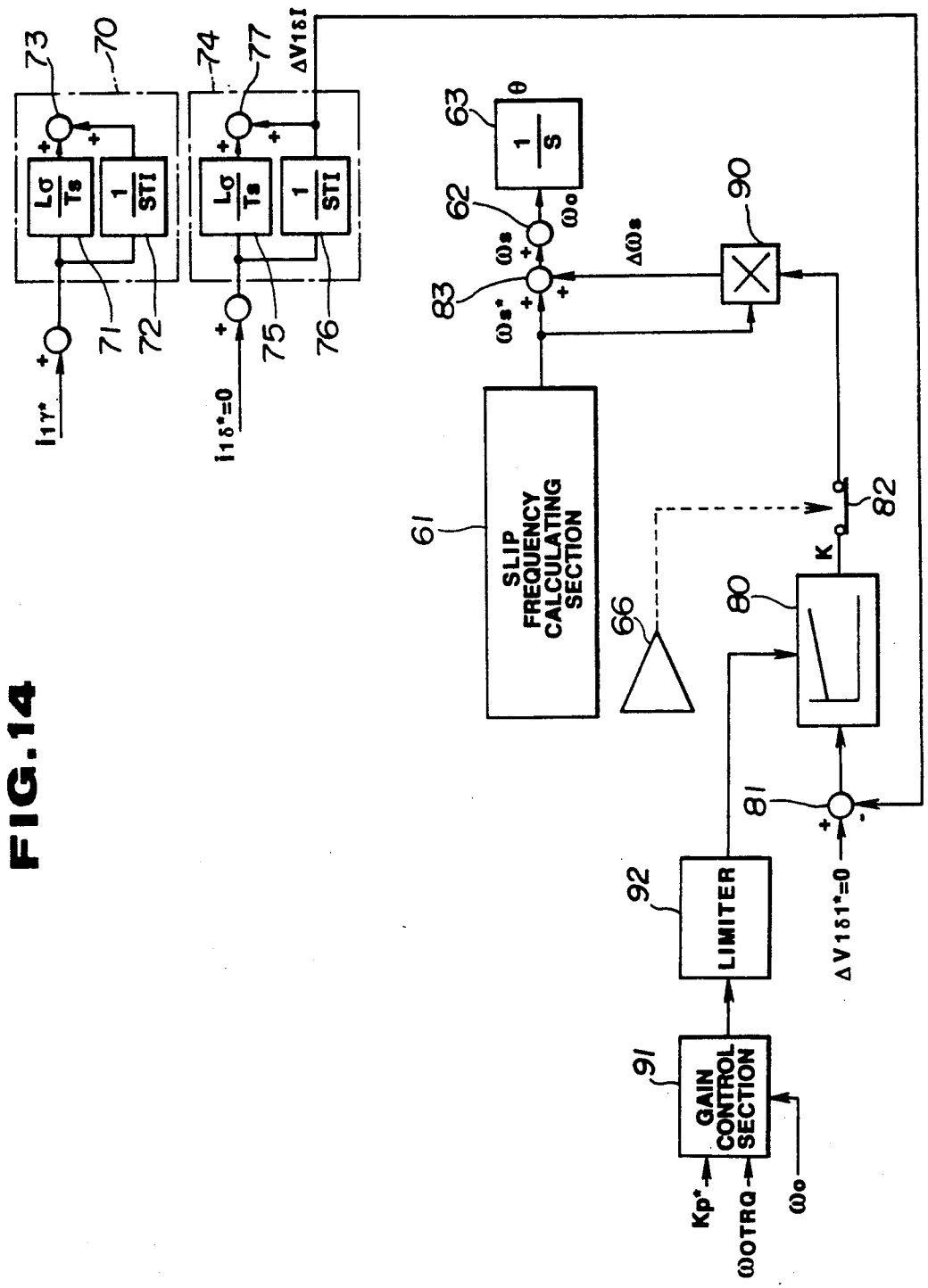
FIG. 14 is a schematic diagram showing another modified form of the fourth embodiment of the invention.

Referring to FIG. 14, there is shown another modified form of the fourth embodiment. The δ-axis primary voltage change $\Delta v1\delta$ caused by a secondary resistance change is given by Equation (50). As can be seen from Equation (50), the δ-axis primary voltage change $\Delta v1\delta$ changes in direct proportion to the primary angular frequency $\omega 0$. For this reason, the primary angular frequency $\omega 0$ and thus the δ-axis primary voltage change $\Delta v1\delta$ are very small in a low frequency region or a motor locked condition. Therefore, the secondary resistance correction response is slow since the values $\Delta v1\delta$ and $\Delta v1\delta I$ are very small. This modification improves the response time by providing a gain control circuit 91 which varies the gain Kp of the proportional plus integral circuit 80 in inverse proportion to the primary angular frequency $\omega 0$ as $Kp = Kp^* \times \omega 0TRQ \omega 0$ where $Kp^*$ is the gain of the proportional plus integral circuit 80 at $\omega 0TRQ$, and $\omega 0TRQ$ is the ground angular frequency. It is preferable to enhance the operation stability of the proportional plus integral circuit 80 by providing a limiter 92 which limits the gain Kp between lower and upper limits Kp1 and Kp2. The primary angular frequency $\omega 0$ is set at $\omega 0TRQ$ and the gain Kp is set at $Kp^*$ if the primary angular frequency $\omega 0$ is in a steady output region.

As described in connection with FIGS. 11 and 14, the δ-axis primary voltage change $\Delta v1\delta$ caused by a secondary resistance change is given by Equation (50). As can be seen from Equation (50), the δ-axis primary voltage change $\Delta v1\delta$ changes in direct proportion to the primary angular frequency $\omega 0$. For this reason, the primary angular frequency $\omega 0$ and thus the δ-axis primary voltage change $\Delta v1\delta$ are very small in a low frequency region or a motor locked condition. Thus, the secondary resistance correction response is slow since the values $\Delta v1\delta$ and $\Delta v1\delta I$ are very small. It is, therefore, desired to increase the accuracy with which the secondary resistance change correction is made and to shorten the identification time. As can be seen from Equation (50), the δ-axis primary voltage change $\Delta v1\delta$ is in direct proportion to the primary voltage angular frequency $\omega 0$. Since the primary voltage angular frequency $\omega 0$ is equal to the slip frequency s in a motor clocked condition ($\omega r = 0$), the δ-axis primary voltage change $\Delta v1\delta$ is in direct proportion to the slip frequency $\omega s$. The slip frequency command value $\omega s^*$ is given as $$\omega_s^* = \frac{R2^*}{L2^*} \cdot \frac{i1q^*}{\lambda 2d^*/M^*}$$

When the torque current command value i1q* is small (at low load conditions), the slip frequency command value ωs* and thus the δ-axis primary voltage change Δv1δ are small. A mechanical brake, which is normally used with the induction motor IM, permits the induction motor IM to drive in a motor locked condition. If the torque current command value i1q* is set at a great value (for example, 50% to 100% of its maximum value) with the application of braking to drive the induction motor in a motor locked condition, the slip frequency command value ωs* and thus the δ-axis primary voltage change Δv1δ will be great. The great δ-axis primary voltage change Δv1δ is used to calculate the secondary resistance change from Equation (53) or operate the proportional plus integral circuit 80 so as to increase the accuracy of the secondary resistance change correction and to shorten the identification time.

FIG. 15 is a flow diagram of the programming of the digital computer used in the induction motor vector control apparatus to calculate the secondary resistance change. The computer program is entered at the point 102. At the point 104 in the program, braking is applied to the induction motor IM. At the point 106 in the program, the torque current command value i1q* is set at a great value (for example, 50% to 100% of its maximum value). At the point 108 in the program, the value (1+K) is calculated as a function of the δ-axis primary voltage change Δv1δ from Equation (53). At the point 110 in the program, the calculated value (1+K) is held. The held value is used as an initial value of the secondary resistance change when the induction motor IM is returned into a normal operating condition. The program then proceeds to the end point 112.

FIG. 16 is a flow diagram of the programming of the digital computer used in the induction motor vector control apparatus to operate the proportional plus integral circuit 80. The computer program is entered at the point 202. At the point 204 in the program, braking is applied to the induction motor IM. At the point 206 in the program, the torque current command value i1q* is set at a great value (for example, 50% to 100% of its maximum value). At the point 208 in the program, the proportional plus integral circuit 80 is operated with the δ-axis primary voltage change Δv1δ is applied to the input of the proportional plus integral circuit 80. At the point 210 in the program, a counter is set. At the point 212 in the program, a determination is made as to whether or not the counter accumulates a count corresponding to a time required for the identification. If the answer to this question is "yes", then the program proceeds to the point 214. Otherwise, the program is returned to the point 212. At the point 214 in the program, the output of the proportional plus integral circuit 80 is held. The held secondary resistance change is used as an initial value of the secondary resistance change when the induction motor IM is returned into a normal operating condition. Following this, the program proceeds to the end point 216.

What is claimed is:

1. An apparatus employing a rotating Cartesian coordinate system (d, q) having a d-axis and q-axis, the d-axis being held in coincidence with a secondary flux of an adjustable-speed induction motor, for vector control of said adjustable-speed induction motor, comprising:

means for applying a primary current and primary voltage to drive the induction motor;

means sensitive to an induction motor angular velocity for producing an induction motor angular velocity value ωr;

means for producing a d-axis secondary flux command value λ2d*;

means for calculating a d-axis primary current command value i1d* as a function of the d-axis secondary flux command value λ2d* and a secondary time constant command value L2*/R2*;

means for producing a q-axis primary current command value i1q*;

means employing a rotating Cartesian coordinate system (γ, δ) having a γ-axis and δ-axis, the γ-axis being held in coincidence with the primary current I1, for calculating a γ-axis primary current command value i1γ* and a phase angle ψ of the γ-axis with respect to the d-axis as a function of the primary current command values i1d* and i1q*;

means for calculating the γ- and δ-axis primary voltage command values v1γ* and v1δ* as a function of the γ-axis primary current command value i1γ*, the phase angle ψ, the d-axis secondary flux command value λ2d*, the γ-axis primary current command value i1γ*, and a primary voltage angular frequency command signal ω0;

means for sensing the primary current and converting the sensed primary current into γ- and δ-axis primary current values i1γ and i1δ;

means for calculating a γ-axis primary voltage change Δv1γ as a function of the γ-axis primary current value i1γ and a γ-axis primary current command value i1γ*;

means for calculating a δ-axis primary voltage change Δv1δ as a function of the δ-axis primary current value i1δ*; value i1δ and a δ-axis primary current command value i1δ*;

means for adding the γ-axis primary voltage change Δv1γ to the γ-axis primary voltage command value v1γ* to produce a γ-axis primary voltage command value v1γ;

means for adding the δ-axis primary voltage change Δv1δ to the δ-axis primary voltage command value i1δ* to produce a δ-axis primary voltage command signal vqδ;

means for calculating a secondary resistance change as a function of the d-axis primary current command value i1d*, the q-axis primary current command value i1q, the γ-axis primary current command value i1γ*, the d-axis secondary flux command value λ2d*, the primary voltage angular frequency ω0 and the δ-axis primary voltage change Δv1δ;

means for correcting the secondary time constant command value L2*/R2* based upon the secondary resistance change;

means for calculating a slip frequency ωs as a function of the q-axis primary current command value i1q*, the d-axis secondary flux command value λ2d*, and the corrected secondary time constant command value;

means for adding the slip frequency ωs to the induction motor angular velocity value ωr to produce the primary voltage angular frequency ω0; and means for controlling the motor driving means to adjust the primary voltage based upon the primary voltage command signals v1γ and v1δ, and the primary voltage angular frequency ω0.

2. The induction motor vector control apparatus as claimed in claim 1, wherein the δ-axis primary voltage change command value Δv1δ is zero.

3. The induction motor vector control apparatus as claimed in claim 1, wherein the γ- and δ-axis primary voltage command values calculating means calculates the γ- and δ-axis primary voltage command values v1γ* and v1δ* as $$v1\gamma^* = R1 \cdot i1\gamma^* + \frac{M^2}{L2} \cdot \omega_0 \cdot \frac{\lambda 2d^*}{M} \cdot \sin\psi$$

$$v1\delta^* = L\sigma \cdot \omega_0 \cdot i1\gamma^* + \frac{M^2}{L2} \cdot \omega_0 \cdot \frac{\lambda 2d^*}{M} \cdot \cos\psi$$

where R1 is the primary resistance of the induction motor, M is the excitation inductance of the induction motor, and L2 is the secondary inductance of the induction motor.

4. The induction motor vector control apparatus as claimed in claim 3, further including means for calculating a change A1 in the primary resistance R1 as a function of the primary resistance R1, the γ-axis primary voltage change Δv1γ, and the d-axis primary current command value i1d* when the induction motor is idling, means for correcting the primary resistance R1 based upon the calculated primary resistance change A1, means for calculating a change AM in the excitation inductance M as a function of the excitation inductance M, the δ-axis primary voltage change Δv1δ, the primary voltage angular frequency ω0, and the d-axis secondary flux command value λ2d* when the induction motor is idling, and means for correcting the excitation inductance M based upon the calculated excitation inductance change AM.

5. The induction motor vector control apparatus as claimed in claim 1, wherein the γ- and δ-axis primary voltage command values calculating means calculates the γ- and δ-axis primary voltage command values v1γ* and v1δ* as $$v1\gamma^* = R1\left(1 + \frac{L\sigma}{R1} \cdot P\right)i1\gamma^* + \frac{M^2}{L2} \cdot \omega_0 \cdot \frac{\lambda 2d^*}{M} \cdot \sin\psi$$

$$v1\delta^* = L\sigma \cdot \omega_0 \cdot i1\gamma^* + \frac{M^2}{L2} \cdot \omega_0 \cdot \frac{\lambda 2d^*}{M} \cdot \cos\psi$$

where R1 is the primary resistance of the induction motor, M is the excitation inductance of the induction motor, L2 is the secondary inductance of the induction motor, and P is a differentiating operator.

6. The induction motor vector control apparatus as claimed in claim 5, further including means for calculating a change A1 in the primary resistance R1 as a function of the primary resistance R1, the γ-axis primary voltage change Δv1γ, and the d-axis primary current command value i1d* when the induction motor is idling, means for correcting the primary resistance R1 based upon the calculated primary resistance change A1, means for calculating a change AM in the excitation inductance M as a function of the excitation inductance M, the δ-axis primary voltage change Δv1δ, the primary voltage angular frequency ω0, and the d-axis secondary flux command value λ2d* when the induction motor is idling, and means for correcting the excitation inductance M based upon the calculated excitation inductance change AM.

7. An apparatus employing a rotating Cartesian coordinate system (d, q) having a d-axis and q-axis, the d-axis being held in coincidence with a secondary flux of an adjustable-speed induction motor, for vector control of said adjustable-speed induction motor, comprising:

means for applying a primary current and primary voltage to drive the induction motor;

means sensitive to an induction motor angular velocity for producing an induction motor angular velocity value ωr;

means for producing a d-axis secondary flux command value λ2d*;

means for calculating a d-axis primary current command value i1d* as a function of the d-axis secondary flux command value λ2d*, and a secondary time constant command value L2*/R2*;

means for producing a q-axis primary current command value i1q*;

means employing a rotating Cartesian coordinate system (γ, δ) having a γ-axis and δ-axis, the γ-axis being held in coincidence with the primary current I1, for calculating a γ-axis primary current command value i1γ* and a phase angle ψ of the γ-axis with respect to the d-axis as a function of the primary current command values i1d* and i1q*;

means for calculating the γ- and δ-axis primary voltage command values v1γ* and v1δ* as a function of the γ-axis primary current command value i1γ*, the phase angle ψ, the d-axis secondary flux command value λ2d*, the γ-axis primary current command value i1γ*, and a primary voltage angular frequency command signal ω0;

means for sensing the primary current and converting the sensed primary current into γ- and δ-axis primary current values i1γ and i1δ;

means for calculating a γ-axis primary voltage change Δv1γ as a function of the γ-axis primary current value i1γ and the γ-axis primary current command value i1γ*;

means for subtracting the δ-axis primary current i1δ from the δ-axis primary current command value i1δ* to produce a difference (i1δ*−i1δ);

means for multiplying the difference (i1δ*−i1δ) by leakage inductance Lσ to produce a multiplied value (i1δ*−i1δ)·Lσ;

means for integrating the difference (i1δ*−i1δ) to produce an integrated value Δv1δI;

means for adding the multiplied value to the integrated value to produce a δ-axis primary voltage change Δv1δ;

means for adding the γ-axis primary voltage change Δv1γ to the γ-axis primary voltage command value v1γ* to produce a γ-axis primary voltage command value v1γ;

means for adding the δ-axis primary voltage change Δv1δ to the δ-axis primary voltage command value v1δ to produce a δ-axis primary voltage command signal v1δ;

means for calculating a secondary resistance change as a function of the d-axis primary current command value i1d*, the q-axis primary current command value i1q*, the γ-axis primary current command value i1γ*, the d-axis secondary flux command value $\lambda 2d^*$, the primary voltage angular frequency $\omega 0$ and the integrated value $\Delta v1\delta I$;

means for correcting the secondary time constant command value $L2^*/R2^*$ based upon the secondary resistance change;

means for calculating a slip frequency $\omega s$ as a function of the q-axis primary current command value $i1q^*$, the d-axis secondary flux command value $\lambda 2d^*$, and the corrected secondary time constant command value;

means for adding the slip frequency $\omega s$ to the induction motor angular velocity value $\omega r$ to produce the primary voltage angular frequency $\omega 0$; and means for controlling the motor driving means to adjust the primary voltage based upon the primary voltage command signals $v1\gamma$ and $v1\delta$, and the primary voltage angular frequency $\omega 0$.

8. The induction motor vector control apparatus as claimed in claim 7, wherein the $\delta$-axis primary voltage change command value $\Delta v1\Delta$ is zero.

9. The induction motor vector control apparatus as claimed in claim 7, further including filter means having a time constant to provide a time lag of first order to the integrated value $\Delta v1\delta I$ fed to the secondary resistance change calculating means, and means for controlling the time constant of the filter means in inverse proportion to the primary voltage angular frequency $\omega 0$.

10. The induction motor vector control apparatus as claimed in claim 7, wherein the $\gamma$-axis primary voltage change calculating means includes:

means for subtracting the $\gamma$-axis primary current $i1\gamma$ from the $\gamma$-axis primary current command value $i1\gamma^*$ to produce a difference $(i1\gamma^* - i1\gamma)$;

means for multiplying the difference $(i1\gamma^* - i1\gamma)$ by a leakage inductance $L\sigma$ to produce a multiplied value $(i1\gamma^* - i1\gamma)\cdot L\sigma$;

means for integrating the difference $(i1\gamma^* - i1\gamma)$ to produce an integrated value $\Delta v1\gamma I$; and means for adding the multiplied value to the integrated value to produce the $\gamma$-axis primary voltage change $\Delta v1\gamma$.

11. The induction motor vector control apparatus as claimed in claim 10, wherein the $\gamma$- and $\delta$-axis primary voltage command values calculating means calculates the $\gamma$- and $\delta$-axis primary voltage command values $v1\gamma^*$ and $v1\delta^*$ as $$v1\gamma^* = R1 \cdot i1\gamma^* + \frac{M^2}{L2} \cdot \omega_0 \cdot \frac{\lambda 2d^*}{M} \cdot \sin\psi$$

$$v1\delta^* = L\sigma \cdot \omega_0 \cdot i1\gamma^* + \frac{M^2}{L2} \cdot \omega_0 \cdot \frac{\lambda 2d^*}{M} \cdot \cos\psi$$

where R1 is the primary resistance of the induction motor, M is the excitation inductance of the induction motor, and L2 is the secondary inductance of the induction motor.

12. The induction motor vector control apparatus as claimed in claim 11, further including means for calculating a change A1 in the primary resistance R1 as a function of the primary resistance R1, the integrated value $\Delta v1\gamma I$, and the d-axis primary current command value $i1d^*$ when the induction motor is idling, means for correcting the primary resistance R1 based upon the calculated primary resistance change A1, means for calculating a change AM in the excitation inductance M as a function of the excitation inductance M, the integrated value $\Delta v1\delta I$, the primary voltage angular frequency $\omega 0$, and the d-axis secondary flux command value $\lambda 2d^*$ when the induction motor is idling, and means for correcting the excitation inductance M based upon the calculated excitation inductance change AM.

13. The induction motor vector control apparatus as claimed in claim 12, further including filter means having a time constant to provide a time lag of first order to the integrated value $\Delta v1\delta I$ fed to the secondary resistance change calculating means, and means for controlling the time constant of the filter means in inverse proportion to the primary voltage angular frequency $\omega 0$.

14. The induction motor vector control apparatus as claimed in claim 13, wherein the $\gamma$- and $\delta$-axis primary voltage command values calculating means calculates the $\gamma$- and $\delta$-axis primary voltage command values $v1\delta^*$ and $v1\delta^*$ ae $$v1\gamma^* = R1\left(1 + \frac{L\sigma}{R1} \cdot P\right)i1\gamma^* + \frac{M^2}{L2} \cdot \omega_0 \cdot \frac{\lambda 2d^*}{M} \cdot \sin\psi$$

$$v1\delta^* = L\sigma \cdot \omega_0 \cdot i1\gamma^* + \frac{M^2}{L2} \cdot \omega_0 \cdot \frac{\lambda 2d^*}{M} \cdot \cos\psi$$

where R1 is the primary resistance of the induction motor, M is the excitation inductance of the induction motor, L2 is the secondary inductance of the induction motor, and P is a differentiating operator.

15. The induction motor vector control apparatus as claimed in claim 14, further including means for calculating a change A1 in the primary resistance R1 as a function of the primary resistance R1, the integrated value $\Delta v1\gamma I$, and the d-axis primary current command value $i1d^*$ when the induction motor is idling, means for correcting the primary resistance R1 based upon the calculated primary resistance change A1, means for calculating a change AM in the excitation inductance M as a function of the excitation inductance M, the integrated value $\Delta v1\delta I$, the primary voltage angular frequency $\omega 0$, and the d-axis secondary flux command value $\lambda 2d^*$ when the induction motor is idling, and means for correcting the excitation inductance M based upon the calculated excitation inductance change AM.

16. The induction motor vector control apparatus as claimed in claim 15, further including filter means having a time constant to provide a time lag of first order to the integrated value $\Delta v1\delta I$ fed to the secondary resistance change calculating means, and means for controlling the time constant of the filter means in inverse proportion to the primary voltage angular frequency $\omega 0$.

17. An apparatus employing a rotating Cartesian coordinate system (d, q) having a d-axis and q-axis, the d-axis being held in coincidence with a secondary flux of an adjustable-speed induction motor, for vector control of said adjustable-speed induction motor, comprising:

means for applying a primary current and primary voltage to drive the induction motor;

means sensitive to an induction motor angular velocity for producing an induction motor angular velocity value $\omega r$;

means for producing a d-axis secondary flux command value $\lambda 2d^*$;

means for calculating a d-axis primary current command value $i1d^*$ as a function of the d-axis secondary flux command value $\lambda 2d^*$, and a secondary time constant command value $L2^*/R2^*$;

means for producing a q-axis primary current command value $i1q^*$;

means employing a rotating Cartesian coordinate system ($\gamma$, $\delta$) having a $\gamma$-axis and $\delta$-axis, the $\gamma$-axis being held in coincidence with the primary current I1, for calculating a $\gamma$-axis primary current command value $i1\gamma^*$ and a phase angle $\psi$ of the $\gamma$-axis with respect to the d-axis as a function of the primary current command values $i1d^*$ and $i1q^*$;

means for calculating the $\gamma$- and $\delta$-axis primary voltage command values $v1\gamma^*$ and $v1\delta^*$ as a function of the $\gamma$-axis primary current command value $i1\gamma^*$, the phase angle $\psi$, the d-axis secondary flux command value $\lambda 2d^*$, the $\gamma$-axis primary current command value $i1\gamma^*$, and a primary voltage angular frequency command signal $\omega 0$;

means for sensing the primary current and converting the sensed primary current into $\gamma$- and $\delta$-axis primary current values $i1\gamma$ and $i1\delta$;

means for calculating a $\gamma$-axis primary voltage change $\Delta v1\gamma$ as a function of the $\gamma$-axis primary current value $i1\gamma$ and the $\gamma$-axis current command value $i1\gamma^*$;

means for calculating a $\delta$-axis primary voltage change $\Delta v1\delta$ as a function of the $\delta$-axis primary current value $i1\delta$ and a $\delta$-axis primary current command value $i1\delta^*$;

means for adding the $\gamma$-axis primary voltage change $\Delta v1\gamma$ to the $\gamma$-axis primary voltage command value $v1\gamma^*$ to produce a $\gamma$-axis primary voltage command value $v1\gamma$;

means for adding the $\delta$-axis primary voltage change $\Delta v1\delta$ to the $\delta$-axis primary voltage command value $v1\delta^*$ to produce a $\delta$-axis primary voltage command signal $v1\delta$;

means for calculating a slip frequency command value $\omega s^*$ as a function of the q-axis primary current command value $i1q^*$ and the d-axis secondary flux command value $\lambda 2d^*$, and the corrected secondary time constant command value;

means for calculating a difference of the $\delta$-axis primary voltage change $\Delta v1\delta$ from a $\delta$-axis primary voltage change command value;

means for calculating a slip frequency change $\Delta \omega s$ as a function of the calculated difference;

means for adding the slip frequency change $\Delta \omega s$ to the slip frequency command value $\omega s^*$ to produce a slip frequency $\omega s$;

means for adding the slip frequency $\omega s$ to the induction motor angular velocity value $\omega r$ to produce the primary voltage angular frequency $\omega 0$; and means for controlling the motor driving means to adjust the primary voltage based upon the primary voltage command signals $v1\gamma$ and $v1\delta$, and the primary voltage angular frequency $\omega 0$.

18. The induction motor vector control apparatus as claimed in claim 17, wherein the $\delta$-axis primary voltage change command value $\Delta v1\delta$ is zero.

19. The induction motor vector control apparatus as claimed in claim 17, wherein the slip frequency change calculating means is a proportional plus integral amplifier having a variable gain.

20. The induction motor vector control apparatus as claimed in claim 19, further including means for controlling the gain of the proportional plus integral amplifier in inverse proportion to the primary voltage angular frequency $\omega 0$.

21. The induction motor vector control apparatus as claimed in claim 17, wherein the $\gamma$- and $\delta$-axis primary voltage command values calculating means calculates the $\gamma$- and $\delta$-axis primary voltage command values $v1\gamma^*$ and $v1\delta^*$ as $$v1\gamma^* = R1 \cdot i1\gamma^* + \frac{M^2}{L2} \cdot \omega_0 \cdot \frac{\lambda 2d^*}{M} \cdot \sin\psi$$

$$v1\delta^* = L\sigma \cdot \omega_0 \cdot i1\gamma^* + \frac{M^2}{L2} \cdot \omega_0 \cdot \frac{\lambda 2d^*}{M} \cdot \cos\psi$$

where R1 is the primary resistance of the induction motor, M is the excitation inductance of the induction motor, and L2 is the secondary inductance of the induction motor.

22. The induction motor vector control apparatus as claimed in claim 21, further including means for calculating a change A1 in the primary resistance R1 as a function of the primary resistance R1, the $\gamma$-axis primary voltage change $\Delta v1\gamma$, and the d-axis primary current command value $i1d^*$ when the induction motor is idling, means for correcting the the primary resistance R1 based upon the calculated primary resistance change A1, means for calculating a change AM in the excitation inductance M as a function of the excitation inductance M, the $\delta$-axis primary voltage change $\Delta v1\delta$, the primary voltage angular frequency $\omega 0$, and the d-axis secondary flux command value $\lambda 2d^*$ when the induction motor is idling, and means for correcting the excitation inductance M based upon the calculated excitation inductance change AM.

23. The induction motor vector control apparatus as claimed in claim 17, wherein the $\gamma$- and $\delta$-axis primary voltage command values calculating means calculates the $\gamma$- and $\delta$-axis primary voltage command values $v1\gamma^*$ and $v1\delta^*$ as $$v1\gamma^* = R1\left(1 + \frac{L\sigma}{R1} \cdot P\right)i1\gamma^* + \frac{M^2}{L2} \cdot \omega_0 \cdot \frac{\lambda 2d^*}{M} \cdot \sin\psi$$

$$v1\delta^* = L\sigma \cdot \omega_0 \cdot i1\gamma^* + \frac{M^2}{L2} \cdot \omega_0 \cdot \frac{\lambda 2d^*}{M} \cdot \cos\psi$$

where R1 is the primary resistance of the induction motor, M is the excitation inductance of the induction motor, L2 is the secondary inductance of the induction motor, and P is a differentiating operator.

24. The induction motor vector control apparatus as claimed in claim 23, further including means for calculating a change A1 in the primary resistance R1 as a function of the primary resistance R1, the $\gamma$-axis primary voltage change $\Delta v1\gamma$, and the d-axis primary current command value $i1d^*$ when the induction motor is idling, means for correcting the the primary resistance R1 based upon the calculated primary resistance change A1, means for calculating a change AM in the excitation inductance M as a function of the excitation inductance M, the $\delta$-axis primary voltage change $\Delta v1\delta$, the primary voltage angular frequency $\omega 0$, and the d-axis secondary flux command value $\lambda 2d^*$ when the induction motor is idling, and means for correcting the excitation inductance M based upon the calculated excitation inductance change AM.

25. The induction motor vector control apparatus as claimed in claim 17, wherein the slip frequency change calculating means includes means for calculating a secondary resistance change K as a function of the calculated difference, and means for multiplying the secondary resistance change K by the slip frequency command value $\omega s^*$ to produce the slip frequency change $\Delta\omega s$.

26. An apparatus employing a rotating Cartesian coordinate system (d, q) having a d-axis and q-axis, the d-axis being held in coincidence with a secondary flux of an adjustable speed induction motor, for vector control of said adjustable-speed induction motor, comprising:

means for applying a primary current and primary voltage to drive the induction motor;

means sensitive to an induction motor angular velocity for producing an induction motor angular velocity value $\omega r$;

means for producing a d-axis secondary flux command value $\lambda 2d^*$;

means for calculating a d-axis primary current command value $i1d^*$ as a function of the d-axis secondary flux command value $\lambda 2d^*$, and a secondary time constant command value $L2^*/R2^*$;

means for producing a q-axis primary current command value $i1q^*$;

means employing a rotating Cartesian coordinate system ($\gamma$, $\delta$) having a $\gamma$-axis and $\delta$-axis, the $\gamma$-axis being held in coincidence with the primary current I1, for calculating a $\gamma$-axis primary current command value $i1\gamma^*$ and a phase angle $\psi$ of the $\gamma$-axis with respect to the d-axis as a function of the primary current command values $i1d^*$ and $i1q^*$;

means for calculating the $\gamma$- and $\delta$-axis primary voltage command values $v1\gamma^*$ and $v1\delta^*$ as a function of the $\gamma$-axis primary current command value $i1\gamma^*$, the phase angle $\omega$, the d-axis secondary flux command value $\lambda 2d^*$, the $\gamma$-axis primary current command value $i1\gamma^*$, and a primary voltage angular frequency command signal $\omega 0$;

means for sensing the primary current and converting the sensed primary current into $\gamma$- and $\delta$-axis primary current values $i1\gamma$ and $i1\delta$;

means for calculating a $\gamma$-axis primary voltage change $\Delta v1\gamma$ as a function of the $\gamma$-axis primary current value $i1\gamma$ and the $\gamma$-axis primary current command value $i1\gamma^*$;

means for substracting the $\delta$-axis primary current $i1\delta$ from the $\delta$-axis primary current command value $i1\delta^*$ to produce a difference ($i1\delta^* - i1\delta$);

means for multiplying the difference ($i1\delta^* - i1\delta$) by a leakage inductance $L\sigma$ to produce a multiplied value ($i1\delta^* - i1\delta$).$L\sigma$;

means for integrating the difference ($i1\delta^* - i1\delta$) to produce an integrated value $\Delta v1\delta I$;

means for adding the multiplied value to the integrated value to produce a $\delta$-axis primary voltage change $\Delta v1\delta$;

means for adding the $\gamma$-axis primary voltage change $\Delta v1\gamma$ to the $\gamma$-axis primary voltage command value $v1\gamma^*$ to produce a $\gamma$-axis primary voltage command value $v1\gamma$;

means for adding the $\delta$-axis primary voltage change $\Delta v1\delta$ to the $\delta$-axis primary voltage command value $v1\delta$ to produce a $\delta$-axis primary voltage command signal $v1\delta^*$;

means for calculating a slip frequency command value $\omega s^*$ as a function of the q-axis primary current command value $i1q^*$ and the d-axis secondary flux command value $\lambda 2d^*$, and the corrected secondary time constant command value;

means for calculating a difference of the $\delta$-axis primary voltage change $\Delta v1\delta$ from a $\delta$-axis primary voltage change command value;

means for calculating a secondary resistance change K as a function of the calculated difference;

means for multiplying the calculated difference by the slip frequency command value $\omega s^*$ to produce a slip frequency change $\Delta\omega s$;

means for adding the slip frequency change $\Delta\omega s$ to the slip frequency command value $\omega s^*$ to produce a slip frequency $\omega s$;

means for adding the slip frequency $\omega s$ to the induction motor angular velocity value $\omega r$ to produce the primary voltage angular frequency $\omega 0$; and means for controlling the motor driving means to adjust the primary voltage based upon the primary voltage command signals $v1\gamma$ and $v1\delta$, and the primary voltage angular frequency $\omega 0$.

27. The induction motor vector control apparatus as claimed in claim 26, wherein the $\delta$-axis primary voltage change command value $\Delta v1\delta$ is zero.

28. The induction motor vector control apparatus as claimed in claim 26, wherein the slip frequency change calculating means is a proportional plus integral amplifier having a variable gain.

29. The induction motor vector control apparatus as claimed in claim 28, further including means for controlling the gain of the proportional plus integral amplifier in inverse proportion to the primary voltage angular frequency $\omega 0$.

* * * * *